(12) United States Patent
Miyabayashi et al.

(10) Patent No.: US 7,407,706 B2
(45) Date of Patent: Aug. 5, 2008

(54) ENCAPSULATED MATTER COMPRISING MULTIPLE POLYMERIC COATINGS OF OPPOSITE CHARGES AND PRODUCTION PROCESS THEREOF

(75) Inventors: Toshiyuki Miyabayashi, Nagano (JP); Makoto Nagase, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 210 days.

(21) Appl. No.: 11/238,831

(22) Filed: Sep. 29, 2005

(65) Prior Publication Data
US 2006/0222851 A1 Oct. 5, 2006

(30) Foreign Application Priority Data
Sep. 30, 2004 (JP) ............... P2004-287728
Sep. 30, 2004 (JP) ............... P2004-287788
Sep. 28, 2005 (JP) ............... P2005-283044

(51) Int. Cl.
*B32B 5/16* (2006.01)
*B05D 5/00* (2006.01)

(52) U.S. Cl. ............ 428/407; 427/221; 427/407.1

(58) Field of Classification Search ............ 428/407; 427/221, 407.1
See application file for complete search history.

(56) References Cited

U.S. PATENT DOCUMENTS

| 4,269,760 A * | 5/1981 | Wakimoto et al. ........ 523/466 |
| 6,864,302 B2 * | 3/2005 | Miyabayashi ............ 523/160 |
| 7,074,843 B2 * | 7/2006 | Nakamura et al. ......... 523/205 |
| 7,253,216 B2 * | 8/2007 | Miyabayashi ............ 523/205 |
| 2003/0195274 A1 * | 10/2003 | Nakamura et al. ......... 523/160 |

FOREIGN PATENT DOCUMENTS

| JP | 11-209672 | 8/1999 |
| JP | 2000-7961 | 1/2000 |

OTHER PUBLICATIONS

Patent Abstracts of Japan of JP 2000-7961 dated Jan. 11, 2000.
Patent Abstracts of Japan of JP 11-209672 dated Aug. 3, 1999.

* cited by examiner

*Primary Examiner*—H. T Le
(74) *Attorney, Agent, or Firm*—Ladas and Parry LLP

(57) ABSTRACT

The present invention relates to encapsulated matter comprising a core material having a charge on a surface thereof and a plurality of coating layers each mainly comprising a polymer with which the core material is coated, the layers comprising at least a first coating layer and a second coating layer, wherein the polymer constituting the first coating layer which contacts the core material comprises at least: (1) a repeating structural unit derived from an ionic polymerizable surfactant A and/or an ionic monomer, each having a charge opposite to the surface charge of the core material; and (2) a repeating structural unit derived from an ionic polymerizable surfactant B having a charge of the same kind as or opposite to the surface charge of the core material, and the polymer constituting the second coating layer which contacts the outside of the first coating layer comprises at least: (3) a repeating structural unit derived from an ionic polymerizable surfactant C and/or an ionic monomer, each having a charge opposite to the surface charge of the first coating layer; and (4) a repeating structural unit derived from an ionic polymerizable surfactant D having a charge of the same kind as or opposite to the surface charge of the first coating layer.

17 Claims, 4 Drawing Sheets

ENCAPSULATED MATTER COMPRISING MULTIPLE POLYMERIC COATINGS OF OPPOSITE CHARGES AND PRODUCTION PROCESS THEREOF

FIELD OF THE INVENTION

The present invention relates to encapsulated matter and a production process thereof.

BACKGROUND OF THE INVENTION

Encapsulation of various materials has hitherto been performed in many industries and technical fields. In the printing, paint and ink industries, encapsulation of pigments or dyes has been in practical use in large numbers. Further, also in the pharmaceutical and agricultural chemical fields, encapsulation of drugs has been in heavy usage, in order to retard their effect or to decrease their toxicity. As encapsulation methods, there have generally been known a phase separation method (a coacervation method), a submerged drying method (an interfacial precipitation method), a spray drying method, a pan coating method, a submerged curing coating method, an interfacial polymerization method, an interfacial inorganic reaction method and an in-situ polymerization method. However, these methods have had the problems that a core material is limited, that it is difficult to freely design the thickness of a shell layer (a coating layer for the core material), that it is difficult to encapsulate one core material, that it is difficult to freely design a functional group on a capsule surface, that it is not easy to produce particles having a homogeneous surface state, and that encapsulation in a nano-order is not easy.

Further, in an ink jet recording process comprising ejecting ink droplets from a fine nozzle head to form letters or figures on a surface of a recording medium such as paper, an aqueous pigment ink in which a pigment is dispersed in water has recently been used because of its excellent water resistance and light resistance. As such an aqueous pigment ink, there has been generally used in many cases one in which the pigment is dispersed in an aqueous dispersing medium with a dispersant such as a surfactant or a polymer dispersant. When the pigment is dispersed with the dispersant as described above, the dispersant is merely adsorbed on surfaces of the pigment particles. Accordingly, in the ink jet recording process in which strong shear force is applied to the pigment particles, the dispersant adsorbed on the surfaces of the pigment particles is eliminated in some cases, whereby dispersibility of the pigment ink deteriorates to cause deterioration in ejection stability (the characteristic of being ejected from a recording head in a definite direction) in some cases. Further, the pigment ink in which the pigment is dispersed in the aqueous dispersing medium with the dispersant such as the surfactant or the polymer dispersant is liable to cause the adsorption and desorption of the dispersant. When the ink is stored for a long period of time, the dispersion is liable to become unstable.

On the other hand, in order to improve fixability of a pigment contained in a pigment-based ink jet ink to a recording medium, a technique using an encapsulated pigment in which colorant particles are coated with a polymer has been known.

There have been proposed encapsulated fine pigment particles (for example, see patent documents 1, 2 and 3), and pigment particles on surfaces of which a polymer is graft polymerized (for example, see patent documents 4 to 7). Further, there has been proposed a method for encapsulating a hydrophobic powder with an amphiphilic graft polymer (for example, see patent document 8). However, the use of a previously polymerized polymer has raised the problem that the particle size after encapsulation becomes too large.

In addition to the above-mentioned proposals, there have been proposed inks using a pigment coated with a resin having film forming properties at room temperature by phase inversion emulsification (for example, see patent documents 9 to 17), and inks using a pigment coated with an anionic group-containing organic polymer compound by acid precipitation (for example, see patent documents 18 to 27).

Further, there have been proposed inks using a polymer emulsion in which fine polymer particles and a colorant are impregnated by phase inversion emulsification (for example, see patent documents 28 to 33). However, in the colorant obtained by phase inversion emulsification or acid precipitation, the polymer adsorbed on the pigment particles is also sometimes eliminated and dissolved in the ink, depending on the kind of organic solvent such as a penetrant used in the ink, so that dispersion stability and ejection stability of the ink, image quality and the like have been insufficient in some cases.

Patent Document 1: JP-B-7-94634
Patent Document 2: JP-A-8-59715
Patent Document 3: JP-A-2003-306661
Patent Document 4: JP-A-5-339516
Patent Document 5: JP-A-8-302227
Patent Document 6: JP-A-8-302228
Patent Document 7: JP-A-8-81647
Patent Document 8: JP-A-5-320276
Patent Document 9: JP-A-8-218015
Patent Document 10: JP-A-8-295837
Patent Document 11: JP-A-9-3376
Patent Document 12: JP-A-8-183920
Patent Document 13: JP-A-10-46075
Patent Document 14: JP-A-10-292143
Patent Document 15: JP-A-11-80633
Patent Document 16: JP-A-11-349870
Patent Document 17: JP-A-2000-7961
Patent Document 18: JP-A-9-31360
Patent Document 19: JP-A-9-217019
Patent Document 20: JP-A-9-316353
Patent Document 21: JP-A-9-104834
Patent Document 22: JP-A-9-151342
Patent Document 23: JP-A-10-140065
Patent Document 24: JP-A-11-152424
Patent Document 25: JP-A-11-166145
Patent Document 26: JP-A-11-199783
Patent Document 27: JP-A-11-209672
Patent Document 28: JP-A-9-286939
Patent Document 29: JP-A-2000-44852
Patent Document 30: JP-A-2000-53897
Patent Document 31: JP-A-2000-53898
Patent Document 32: JP-A-2000-53899
Patent Document 33: JP-A-2000-53900

SUMMARY OF THE INVENTION

The invention has been made in view of the above-mentioned problems, and an object of the invention is to provide encapsulated matter which can highly exhibit various functions in various industries and technical fields, and a production process thereof.

Other objects and effects of the invention will become apparent from the following description.

Further, for an ink jet recording pigment ink, the invention has been made in view of the above-mentioned problems, and an object of the invention is to provide an encapsulated pigment which not only satisfies all the following (1) to (6), but also can highly exhibit other various functions, and which is capable of preparing an ink jet recording ink, and a production process thereof.

(1) Excellent in dispersion stability;

(2) Excellent in ejection stability from a recording head;

(3) Capable of obtaining recorded matter excellent in fastness of images;

(4) Capable of obtaining recorded matter excellent in print density of images;

(5) Capable of obtaining recorded matter excellent in abrasion resistance of images; and (6) Capable of obtaining recorded matter in which images are hard to blur, and which is excellent in color developability of images, even when plain paper is used as a recording medium.

As a result of intensive studies, the present inventors have discovered the following technical constitutions, thus having completed the invention.

(1) Encapsulated matter comprising:

a core material having a charge on a surface thereof and;

a plurality of coating layers each mainly comprising a polymer with which the core material is coated, the layers comprising at least a first coating layer and a second coating layer, wherein the polymer constituting the first coating layer which contacts the core material comprises at least:

(I) a repeating structural unit derived from an ionic polymerizable surfactant A and/or an ionic monomer, each having a charge opposite to the surface charge of the core material; and (II) a repeating structural unit derived from an ionic polymerizable surfactant B having a charge of the same kind as or opposite to the surface charge of the core material, and wherein the polymer constituting the second coating layer which contacts the outside of the first coating layer comprises at least:

(III) a repeating structural unit derived from an ionic polymerizable surfactant C and/or an ionic monomer, each having a charge opposite to the surface charge of the first coating layer; and (IV) a repeating structural unit derived from an ionic polymerizable surfactant D having a charge of the same kind as or opposite to the surface charge of the first coating layer;

(2) The encapsulated matter described in (1) which has a third or subsequent coating layer, wherein the polymer constituting the coating layer comprises at least:

(I) a repeating structural unit derived from an ionic polymerizable surfactant C and/or an ionic monomer, each having a charge opposite to the surface charge of a coating layer located immediately beneath; and (II) a repeating structural unit derived from the ionic polymerizable surfactant D having a charge of the same kind as or opposite to the surface charge of the coating layer located immediately beneath;

(3) The encapsulated matter described in (1) or (2) which comprises, together with the repeating unit derived from the above-mentioned ionic polymerizable surfactant B or ionic polymerizable surfactant D, a repeating structural unit derived from an ionic monomer having a charge of the same kind as that of the respective ionic polymerizable surfactant;

(4) The encapsulated matter described in any one of (1) to (3), wherein at least any one polymer of the above-mentioned respective coating layers comprises a repeating structural unit derived from a hydrophobic monomer;

(5) A process for producing encapsulated matter comprising a core material having a charge on a surface thereof and a plurality of coating layers each mainly comprising a polymer with which the core material is coated, the layers comprising at least a first coating layer and a second coating layer, which process comprises:

(I) adding an ionic polymerizable surfactant A and/or an ionic monomer, each having a charge opposite to the surface charge of the core material to an aqueous dispersion of the core material having the charge on the surface thereof, followed by mixing; then, (II) adding an ionic polymerizable surfactant B having a charge of the same kind as or opposite to the surface charge of the core material, followed by mixing and emulsification, and adding a polymerization initiator thereto to conduct polymerization in water, thereby forming the first coating layer; subsequently, (III) adding an ionic polymerizable surfactant C and/or an ionic monomer, each having a charge opposite to the surface charge of the first coating layer to an aqueous dispersion of coated matter having the first coating layer, followed by mixing; and thereafter, (IV) adding an ionic polymerizable surfactant D having a charge of the same kind as or opposite to the surface charge of the first coating layer, followed by mixing and emulsification, and adding a polymerization initiator thereto to conduct polymerization in water, thereby forming the second coating layer;

(6) The process for producing encapsulated matter described in (5), which comprises:

(I) adding an ionic polymerizable surfactant C and/or an ionic monomer, each having a charge opposite to the surface charge of the encapsulated matter to an aqueous solution of the encapsulated matter with at least the first coating layer and the second coating layer formed, followed by mixing; and then, (II) adding an ionic polymerizable surfactant D having a charge of the same kind as or opposite to the surface charge of the encapsulated matter, followed by mixing and emulsification, and adding a polymerization initiator thereto to conduct polymerization in water, thereby forming a third or subsequent coating layer;

(7) A process for producing encapsulated matter comprising a core material having a charge on a surface thereof and a plurality of coating layers each mainly comprising a polymer with which the core material is coated, the layers comprising at least a first coating layer and a second coating layer, which process comprises:

(I) adding an ionic polymerizable surfactant A and/or an ionic monomer, each having a charge opposite to the surface charge of the core material to an aqueous dispersion of the core material having the charge on the surface thereof, followed by mixing; then, (II) adding an ionic polymerizable surfactant B having a charge of the same kind as or opposite to the surface charge of the core material and an ionic monomer having a charge of the same kind as that of the ionic polymerizable surfactant B, followed by mixing and emulsification, and adding a polymerization initiator thereto to conduct polymerization in water, thereby forming the first coating layer; subsequently, (III) adding an ionic polymerizable surfactant C and/or an ionic monomer, each having a charge opposite to the surface charge of the first coating layer to an aqueous dispersion of coated matter having the first coating layer, followed by mixing; and thereafter, (IV) adding an ionic polymerizable surfactant D having a charge of the same kind as or opposite to the surface charge of the first coating layer and an ionic monomer having a charge of the same kind as that of the ionic polymerizable surfactant D, followed by mixing and emulsification, and adding a polymerization initiator thereto to conduct polymerization in water, thereby forming the second coating layer;

(8) The process for producing encapsulated matter described in (7), which comprises:

(I) adding an ionic polymerizable surfactant C and/or an ionic monomer, each having a charge opposite to the surface charge of the encapsulated matter to an aqueous solution of the encapsulated matter with at least the first coating layer and the second coating layer formed, followed by mixing; and then, (II) adding an ionic polymerizable surfactant D having a charge of the same kind as or opposite to the surface charge of the encapsulated matter and an ionic monomer having a charge of the same kind as that of the ionic polymerizable surfactant D, followed by mixing and emulsification, and adding a polymerization initiator thereto to conduct polymerization in water, thereby forming a third or subsequent coating layer;

(9) The process for producing encapsulated matter described in any one of (5) to (8), wherein a hydrophobic monomer is added together with each ionic polymerizable surfactant and/or ionic monomer at the time when at least any one of the respective coating layers is formed;

(10) The process for producing encapsulated matter described in (9), wherein before the addition of the ionic polymerizable surfactant B or the ionic polymerizable surfactant D, the hydrophobic monomer is added, followed by mixing;

(11) The process for producing encapsulated matter described in (9), wherein after the addition and mixing of the ionic polymerizable surfactant B or the ionic polymerizable surfactant D, the hydrophobic monomer is added, followed by mixing;

(12) An encapsulated pigment described in any one of (1) to (4), wherein the core material is a pigment particle;

(13) A pigment dispersion comprising the above-mentioned encapsulated pigment; and

(14) A pigment ink comprising the above-mentioned encapsulated pigment.

According to the encapsulated matter and the production process thereof of the invention, (1) the encapsulated matter is easily made highly functional and highly efficient, because the polymer layers for coating the core material can be overlaid in several layers in the invention, and it is possible to impart different functions to the respective polymer layers. Further, (2) the polymer layers for coating the core material are overlaid in several layers, thereby being able to thicken the coating layer. (3) Although, in encapsulated matter of a monolayer, it is necessary to contrive the preparation of constituent components in order to give various necessary characteristics to the polymer layer, it is possible to easily obtain the encapsulated matter having the desired characteristics by giving different functions to the respective polymer layers in the invention.

Figure 1:
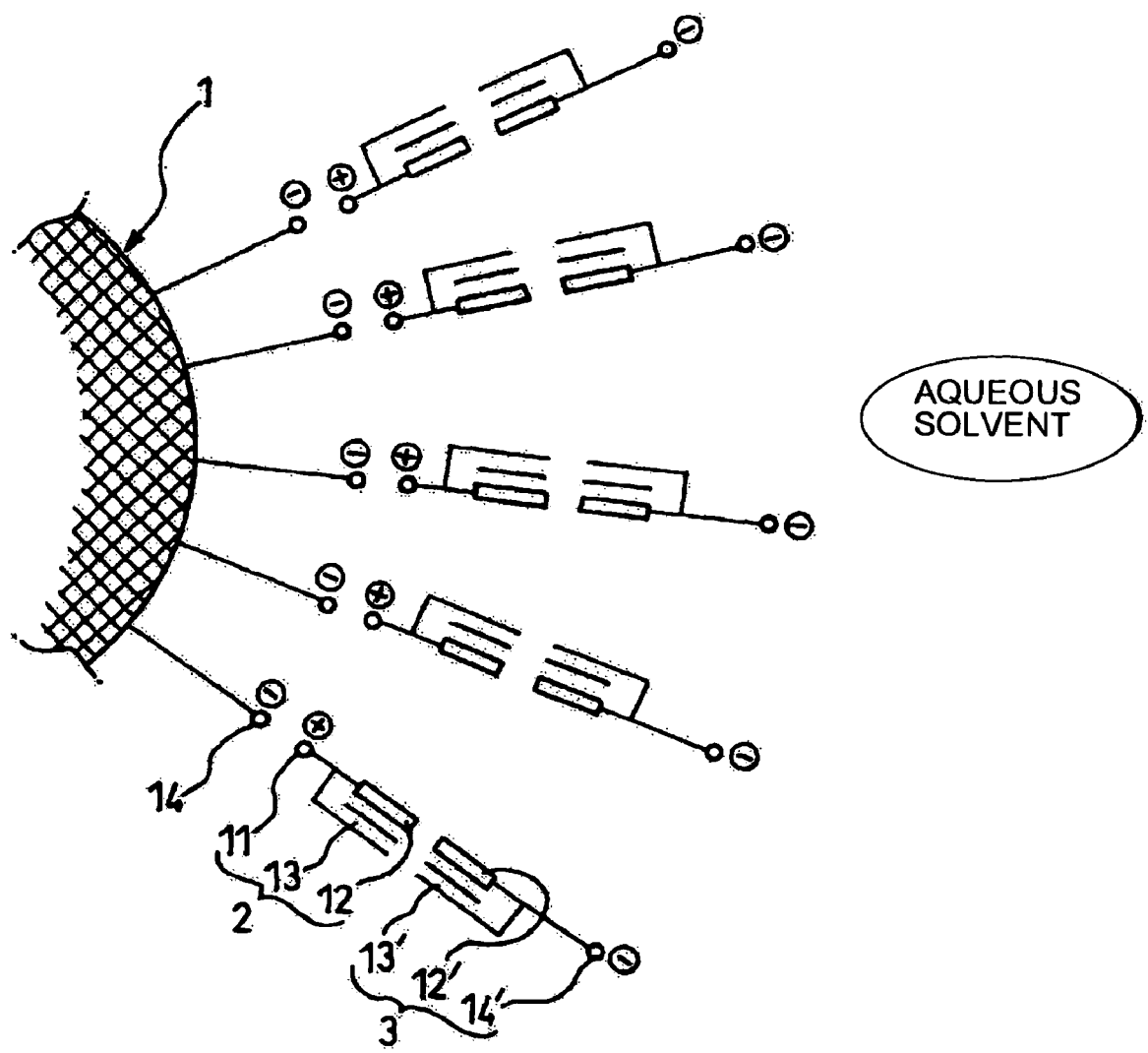
FIG. 1 is a schematic view showing a state in which a core material having a charge on a surface thereof is dispersed in an aqueous solvent, and coexists with a cationic polymerizable surfactant and an anionic polymerizable surfactant before polymerization in a first coating layer.

The reference numerals used in the drawings denote the followings, respectively.

1: Core Material
2: Cationic Polymerizable Surfactant
3: Anionic Polymerizable Surfactant
11: Cationic Group
12, 12': Hydrophobic Groups
13, 13': Polymerizable Groups
14, 14', 14": Anionic Groups
60', 60": Polymer Layers (Polymers)
100: Encapsulated Matter

DETAILED DESCRIPTION OF THE INVENTION

The encapsulated matter of the invention and the production process thereof will be illustrated in detail below.

The encapsulated matter according to the invention is encapsulated matter comprising a core material having a charge on a surface thereof and a plurality of coating layers each mainly comprising a polymer with which the core material is coated, in which the polymer constituting a first coating layer which contacts the core material comprises at least (1) a repeating structural unit derived from an ionic polymerizable surfactant A and/or an ionic monomer, each having a charge opposite to the surface charge of the core material, and (2) a repeating structural unit derived from an ionic polymerizable surfactant B having a charge of the same kind as or opposite to the surface charge of the core material, and the polymer constituting a second coating layer which contacts the outside of the first coating layer or constituting a further coating layer comprises at least (3) a repeating structural unit derived from an ionic polymerizable surfactant C and/or an ionic monomer, each having a charge opposite to the surface charge of the first coating layer or the coating layer located immediately beneath, and (4) a repeating structural unit derived from an ionic polymerizable surfactant D having a charge of the same kind as or opposite to the surface charge of the first coating layer or the coating layer located immediately beneath.

The above-mentioned coating layers only require at least two layers, and may be three layers or more as needed.

Such encapsulated matter can be suitably produced by (1) adding an ionic polymerizable surfactant A and/or an ionic monomer, each having a charge opposite to a surface charge of a core material to an aqueous dispersion of the core material having the charge on the surface thereof, followed by mixing, then, (2) adding an ionic polymerizable surfactant B having a charge of the same kind as or opposite to the surface charge of the core material, followed by mixing and emulsification, and adding a polymerization initiator thereto to conduct polymerization in water, thereby forming a first coating layer, subsequently, (3) adding an ionic polymerizable surfactant C and/or an ionic monomer, each having a charge opposite to the surface charge of the first coating layer or a layer located immediately beneath to an aqueous dispersion of coated matter having the first coating layer, followed by mixing, and thereafter, (4) adding an ionic polymerizable surfactant D having a charge of the same kind as or opposite to the surface charge of the first coating layer or the layer located immediately beneath, followed by mixing and emulsification, and adding a polymerization initiator thereto to conduct polymerization in water, thereby forming a second coating layer or a further coating layer.

Alternatively, the encapsulated matter can be suitably produced by (1) adding an ionic polymerizable surfactant A and/or an ionic monomer, each having a charge opposite to a surface charge of a core material to an aqueous dispersion of the core material having the charge on the surface thereof, followed by mixing, then, (2) adding an ionic polymerizable surfactant B having a charge of the same kind as or opposite to the surface charge of the core material and an ionic monomer having a charge of the same kind as that of the ionic polymerizable surfactant B, followed by mixing and emulsification, and adding a polymerization initiator thereto to conduct polymerization in water, thereby forming a first coating layer, subsequently, (3) adding an ionic polymerizable surfactant C and/or an ionic monomer, each having a charge opposite to the surface charge of the first coating layer or a layer located immediately beneath to an aqueous dispersion of coated matter having the first coating layer, followed by mixing, and thereafter, (4) adding an ionic polymerizable surfactant D having a charge of the same kind as or opposite to the surface charge of the first coating layer or the layer located immediately beneath and an ionic monomer having a charge of the same kind as that of the ionic polymerizable surfactant D, followed by mixing and emulsification, and adding a polymerization initiator thereto to conduct polymerization in water, thereby forming a second coating layer or a further coating layer.

According to such a polymerization process, (1) an ionic group on the surface of the core material is ionically bonded to an ionic group of the ionic polymerizable surfactant A and/or the ionic monomer having the charge opposite to that of the ionic group on the surface of the core material, (2) a hydrophobic group of the ionic polymerizable surfactant A and/or the ionic monomer and a hydrophobic group of the ionic polymerizable surfactant B having the charge of the same kind as or opposite to the surface charge of the core material face each other to form the first layer between the hydrophobic layers, then, (3) an ionic group on the surface of the first coating layer or the surface of the coating layer located immediately beneath is ionically bonded to an ionic group of the ionic polymerizable surfactant C and/or the ionic monomer having the charge opposite to the surface charge of the first coating layer or the coating layer located immediately beneath, (4) a hydrophobic group of the ionic polymerizable surfactant C and/or the ionic monomer and a hydrophobic group of the ionic polymerizable surfactant D having the charge of the same kind as or opposite to the surface charge of the first coating layer or the layer located immediately beneath face each other to form the second layer or the further layer between the hydrophobic layers, and (5) there is formed a structure in which an ionic group of the ionic polymerizable surfactant D is orientated toward the aqueous phase side.

That is to say, the form of arrangement of the ionic polymerizable surfactant and/or the ionic monomer existing around the core material before polymerization reaction is controlled to extremely high accuracy, and in an outermost shell, there is formed a state in which the ionic group is orientated toward the aqueous phase. Then, the ionic polymerizable surfactant and/or the ionic monomer are converted to the polymer by polymerization reaction, as this highly controlled form is maintained. Further, around the surface of the polymer layer (coating layer), the form of arrangement of the ionic polymerizable surfactant and/or the ionic monomer is controlled to extremely high accuracy, and in the outermost shell, there is formed a state in which the ionic group is orientated toward the aqueous phase, in the same manner as described above. Then, the ionic polymerizable surfactant and/or the ionic monomer are converted to the polymer by polymerization reaction, as this highly controlled form is maintained, thereby further forming a second or subsequent layer. Accordingly, in the microencapsulated matter of the invention, the structure thereof is controlled to extremely high accuracy.

The structure of the encapsulated matter of the invention will be illustrated below with reference to the drawings.

FIG. 1 is a view showing a state in which a core material 1 having an anionic group 14 as a hydrophilic group on a surface thereof is dispersed in a solvent containing water as a main component (hereinafter also referred to as an aqueous medium), and coexists with an cationic polymerizable surfactant 2 (ionic polymerizable surfactant A, hereinafter also briefly indicated as A) having a cationic group 11, a hydrophobic group 12 and a polymerizable group 13, and an anionic polymerizable surfactant 3 (ionic polymerizable surfactant B, hereinafter also briefly indicated as B) having an anionic group 14', a hydrophobic group 12' and a polymerizable group 13'. The cationic polymerizable surfactant A is arranged so that the cationic group 11 thereof is directed toward the anionic group 14 of the core material 1, and adsorbed by a strong ionic bond. Then, the hydrophobic group 12' and the polymerizable group 13' of the anionic polymerizable surfactant 3(B) are directed toward the hydrophobic group 12 and the polymerizable group 13 of the cationic polymerizable surfactant 2(A) by a hydrophobic interaction, and the other group of the anionic polymerizable surfactant 3(B), i.e., the anionic group 14', is directed toward a direction in which the aqueous medium exists, that is to say, a direction departing from the core material 1.

Figure 2:
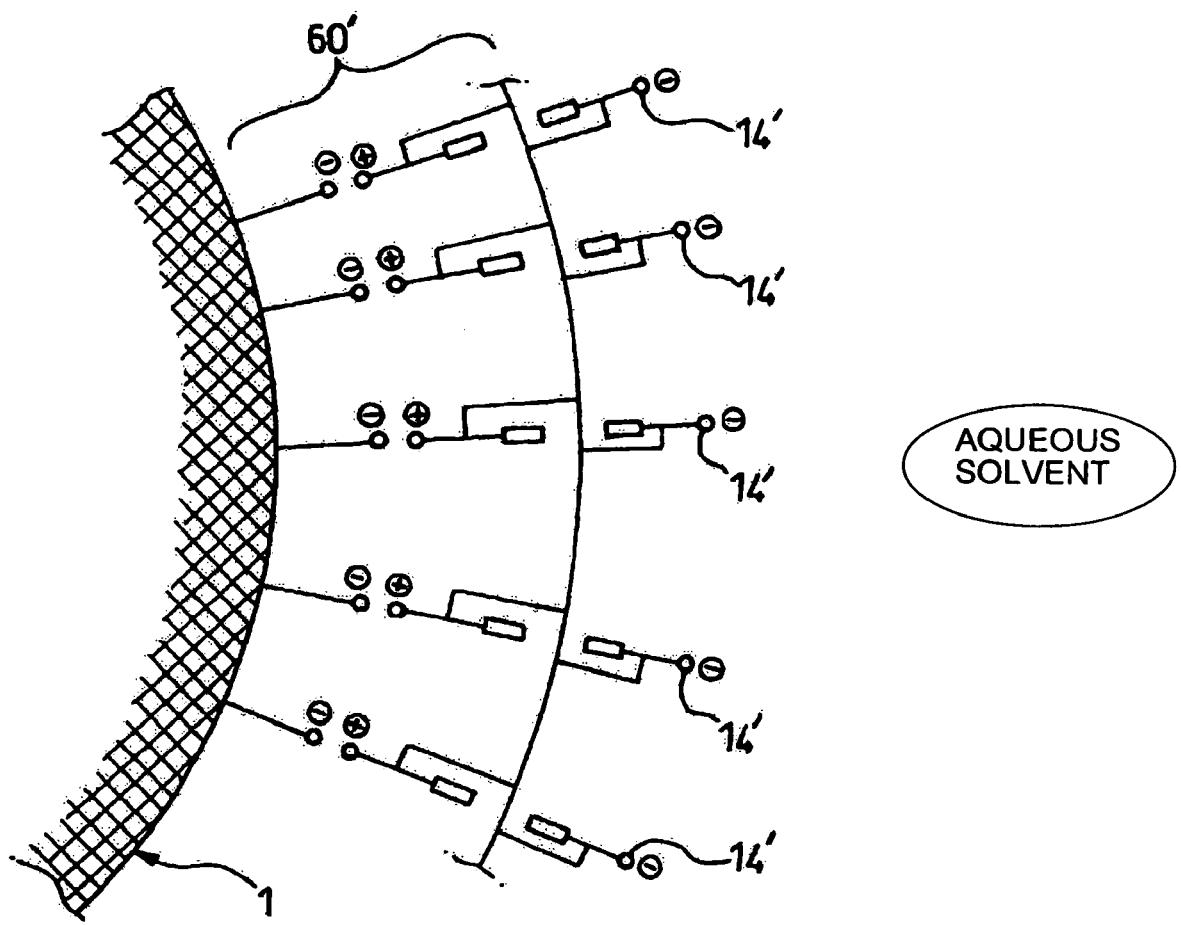
FIG. 2 is a schematic view of the first coating layer showing a state in which the cationic polymerizable surfactant and the anionic polymerizable surfactant are polymerized in the dispersed state shown in FIG. 1.

To such an aqueous dispersion, for example, a polymerization initiator is added to polymerize the polymerizable group 13 of the cationic polymerizable surfactant 2(A) and the polymerizable group 13' of the anionic polymerizable surfactant 3(B), whereby the core material 1 is coated with a polymer layer 60' or a first coating layer, as shown in FIG. 2. The surface of the polymer layer 60' has the anionic group 11', so that the particle coated with a polymer layer 60' or the first coating layer is dispersible in the aqueous medium.

Figure 3:
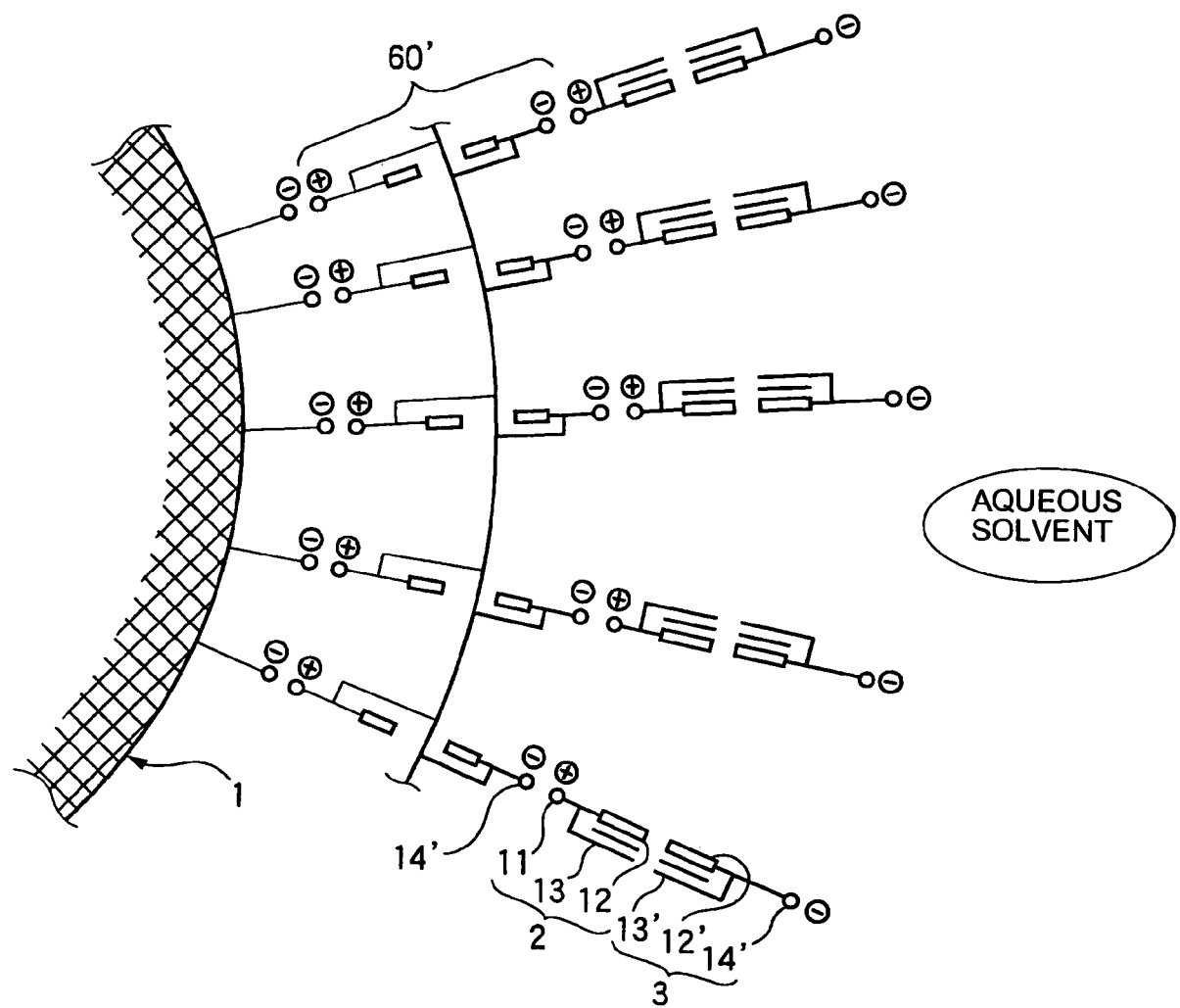
FIG. 3 is a schematic view showing a state in which the core material coated with the first coating layer is dispersed in an aqueous solvent, and coexists with a cationic polymerizable surfactant and an anionic polymerizable surfactant before polymerization in a second coating layer.
Figure 4:
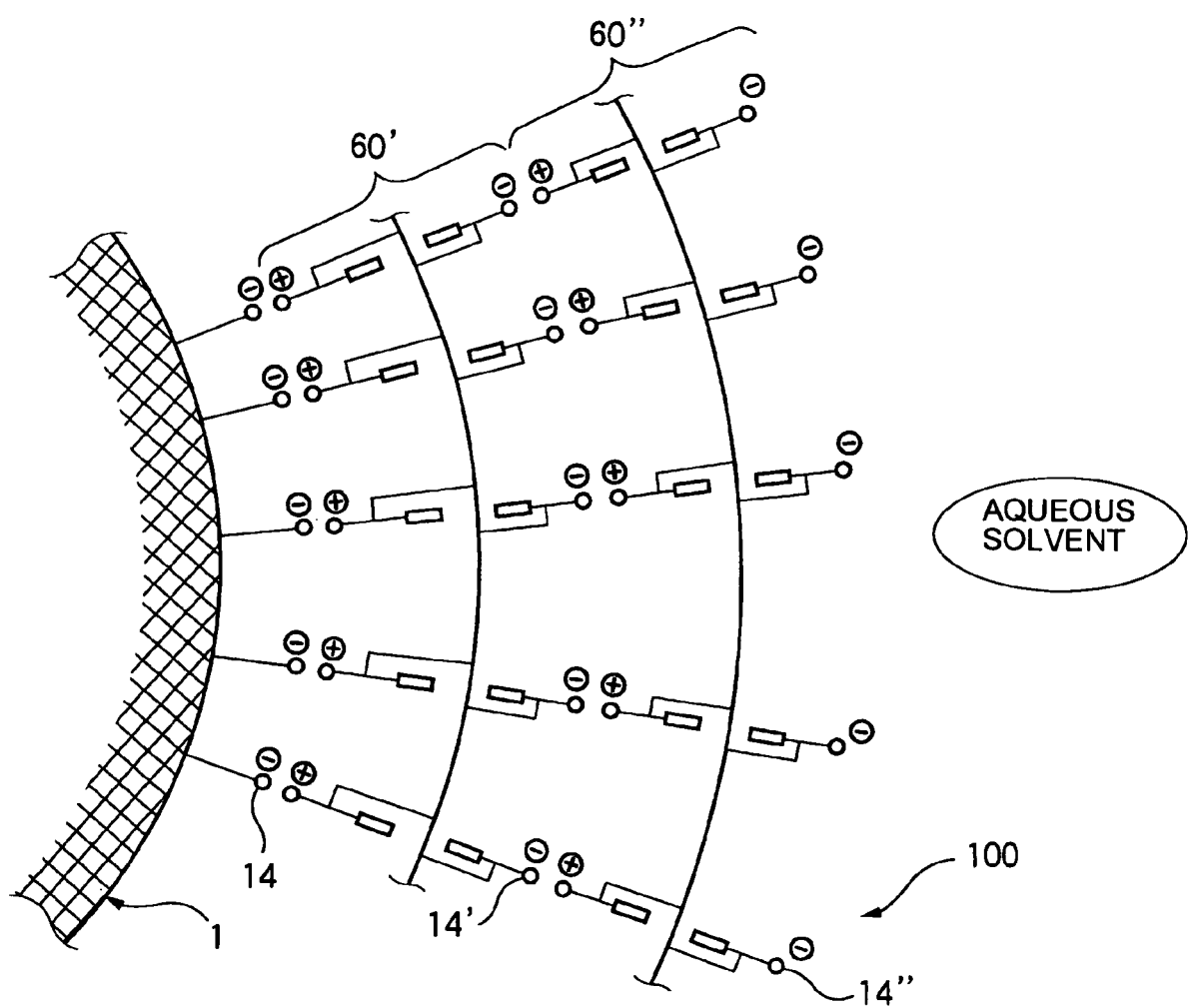
FIG. 4 is a schematic view of the first coating layer and the second coating layer showing a state in which the cationic polymerizable surfactant and the anionic polymerizable surfactant are polymerized in the dispersed state shown in FIG. 3.

Further, when the cationic polymerizable surfactant 2 (ionic polymerizable surfactant C, hereinafter also briefly indicated as C) and the anionic polymerizable surfactant 3 (ionic polymerizable surfactant D, hereinafter also briefly indicated as D) are allowed to coexist in the aqueous dispersion of the particles coated with the polymer layer 60' or the first coating layer, in the same manner as described above, the cationic polymerizable surfactant 2(C) is arranged so that the cationic group 11 thereof is directed toward the anionic group 14' on the surface of the polymer layer 60', and adsorbed by a strong ionic bond, as shown in FIG. 3. Then, the hydrophobic group 12' and the polymerizable group 13' of the anionic polymerizable surfactant D are directed toward the hydrophobic group 12 and the polymerizable group 13 of the cationic polymerizable surfactant 2(C) by a hydrophobic interaction, and the other group of the anionic polymerizable surfactant 3(D), the anionic group 14', is directed toward a direction in which the aqueous medium exists, that is to say, a direction departing from the core material 1. Then, to such an aqueous dispersion, for example, a polymerization initiator is added to polymerize the polymerizable group 13 of the cationic polymerizable surfactant 2(C) and the polymerizable group 13' of the anionic polymerizable surfactant 3(D), by the same method as described above, thereby preparing micro-encapsulated matter 100 of the invention in which the core material 1 is coated with two layers of the first coating layer (polymer layer 60') and a second coating layer (polymer layer 60"), as shown in FIG. 4. Here, a surface of the polymer layer 60" has an anionic group 14", so that the microencapsulated matter 100 is dispersible in the aqueous medium.

Although the dispersed states have been described above with reference to the drawings, first, the core material 1 has the anionic group on its surface, thereby bringing about a state in which it is dispersed in the aqueous medium. According to such encapsulated matter of the invention, the anionic groups on the surface of the encapsulated matter are regularly and densely orientated toward a direction in which the aqueous medium exists, as shown in FIG. 4. Accordingly, dispersion stability of the encapsulated matter to the aqueous medium can be improved.

In the encapsulated matter of the invention, the ionic groups are considered to be regularly and densely orientated toward the aqueous medium side as described above, so that effective electrostatic repulsion is considered to be generated between the encapsulated matter. Further, in addition to such electrostatic repulsion, an effect by steric hindrance due to the polymer with which the core material is coated (polymer effect) is considered to contribute excellent dispersion stability of the encapsulated matter of the invention in the aqueous medium.

The core material 1 described in the above-mentioned drawings has either a positive charge or a negative charge. The ionic polymerizable surfactant A has a charge opposite to the surface charge of the core material 1, and the ionic polymerizable surfactant B has a charge of the same kind as or opposite to the surface charge of the core material 1. When the encapsulated matter is coated with films of two layers in the encapsulated matter, the ionic polymerizable surfactant C has a charge opposite to the surface charge of the first coating layer, and when the encapsulated matter is coated with films of three or more layers in the encapsulated matter, it has a charge opposite to the surface charge of the coating layer located immediately beneath. When the encapsulated matter is coated with films of two layers in the encapsulated matter, the ionic polymerizable surfactant D has a charge of the same kind as or opposite to the surface charge of the first coating layer, and when the encapsulated matter is coated with films of three or more layers in the encapsulated matter, it has a charge of the same kind as or opposite to the surface charge of the coating layer located immediately beneath.

Further, it is possible to use the ionic monomer instead of the ionic polymerizable surfactants B and D. Furthermore, together with the ionic polymerizable surfactants B and D, it is also possible to have a repeating structural unit derived from the ionic monomer having a charge of the same kind as that of each ionic polymerizable surfactant.

It is preferred that the encapsulated matter of the invention has an aspect ratio (long-to-short degree) of 1.0 to 1.3, and a Zingg index of 1.0 to 1.3 (more preferably 1.0 to 1.2).

When the minor diameter, major diameter and thickness of a particle are taken as b, l and t ($l \geq b \geq t > 0$), respectively, the aspect ratio (long-to-short degree) is $1/b$ ($\geq 1$), the degree of flatness is $b/t$ ($\geq 1$), and the Zingg index is the long-to-short degree/the degree of flatness=$(l \cdot t)/b^2$. That is to say, the true sphere has an aspect ratio of 1 and a Zingg index of 1.

When the Zingg index is larger than 1.3, the encapsulated matter becomes flatter in shape to lower the isotropy. Although there is no particular limitation on the method for adjusting the aspect ratio and the Zingg index within the above-mentioned ranges, the encapsulated matter obtained by coating the core material having an anionic group on its surface with the polymer by the above-mentioned emulsion polymerization method can easily satisfy these conditions.

As for encapsulated matter prepared by methods other than the emulsion polymerization method, such as acid precipitation and phase inversion emulsification, it is difficult to adjust the aspect ratio and the Zingg index within the above-mentioned ranges.

The encapsulated pigment of the invention in which the core material is a pigment has an aspect ratio and a Zingg index within the above-mentioned ranges, and is shaped like a true sphere. Accordingly, an ink easily becomes Newtonian in its fluid characteristics, resulting in excellent ejection stability. Further, when the ink lands on a recording medium such as paper, the encapsulated pigment is arranged on the recording medium at high density because of their true sphere shape, which makes it possible to express print density and color development at high efficiency. Furthermore, it is excellent in dispersibility and dispersion stability because of its true sphere shape.

Constituents of the encapsulated matter of the invention will be illustrated in detail below.

Core Material

The core material of the encapsulated matter of the invention is one having a charge on its surface, or one in which a functional group having a charge is introduced onto its surface by chemical treatment or the like. Specifically, the core materials include a colorant, inorganic matter, organic matter, inorganic-organic composite particles, inorganic colloidal particles, polymer particles and a metal oxide (such as silica or titania).

When the organic matter is encapsulated by the process of the invention, for example, there can be achieved an effect of improving handleability of a dangerous chemical or the like. Further, when the inorganic-organic composite particles of the invention are produced by the process of the invention, they can be used as a filler for a resin formed article or the like, and can improve the characteristics. Furthermore, when the inorganic matter is encapsulated by the process of the invention, the encapsulated matter can be used as a hard coat material having high transparency. Moreover, when the colorant is encapsulated by the process of the invention, the encapsulated matter can be used as a coloring agent such as a paint, a pigment ink or a toner.

In the encapsulated matter according to the invention, the above-mentioned core materials can also be used either alone or as a combination of two or more thereof.

The colorants which can be used in the invention will be described in more detail below.

The inorganic pigments include carbon blacks (C.I. Pigment Black 7) such as furnace black, lamp black, acetylene black and channel black, and an iron oxide pigment. As the organic pigments, there can be used an azo pigment (including azo lake, an insoluble azo pigment, a condensed azo pigment and a chelate azo pigment), a polycyclic pigment (for example, a phthalocyanine pigment, a perylene pigment, a perinone pigment, an anthraquinone pigment, a quinacridone pigment, a dioxane pigment, a thioindigo pigment, an isoindolinone pigment or a quinofranone pigment), a dye chelate (for example, a basic dye chelate or an acidic dye chelate), a nitro pigment, a nitroso pigment and aniline black.

The pigments which can be used in the invention will be described in detail below.

The inorganic pigments used for black include carbon blacks such as No. 2300, No. 900, MCF88, No. 33, No. 40, No. 45, No. 52, MA7, MA8, MA100 and No. 2200B manufactured by Mitsubishi Chemical Corporation; Raven 5750, Raven 5250, Raven 5000, Raven 3500, Raven 1255 and Raven 700 manufactured by Columbian Chemicals Company; Regal 400R, Regal 330R, Regal 660R, Mogul L, Monarch 700, Monarch 800, Monarch 880, Monarch 900, Monarch 1000, Monarch 1100, Monarch 1300 and Monarch 1400 manufactured by Cabot Corporation; and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 manufactured by Degussa Corporation. Further, as the organic pigments for black, there can be used black organic pigments such as aniline black (C.I. Pigment Black 1).

The yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172 and C.I. Pigment Yellow 180.

The magenta organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43 and C.I. Pigment Violet 50.

The cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4 and C.I. Vat Blue 60. These can be used as colorants for cyan inks.

Further, the organic pigments other than the magenta, cyan and yellow pigments include C.I. Pigment Green 7, C.I. Pigment Green 10, C.I. Pigment Brawn 3, C.I. Pigment Brawn 5, C.I. Pigment Brawn 25, C.I. Pigment Brawn 26, C.I. Pigment Orange 1, C.I. Pigment Orange 2, C.I. Pigment Orange 5, C.I. Pigment Orange 7, C.I. Pigment Orange 13, C.I. Pigment Orange 14, C.I. Pigment Orange 15, C.I. Pigment Orange 16, C.I. Pigment Orange 24, C.I. Pigment Orange 34, C.I. Pigment Orange 36, C.I. Pigment Orange 38, C.I. Pigment Orange 40, C.I. Pigment Orange 43 and C.I. Pigment Orange 63. These can also be used as colorants for inks.

In the invention, in addition to the above-mentioned organic pigments, there can also be suitably used a dye insoluble or lightly soluble in water, such as a disperse dye or an oil-soluble dye.

In the pigment used as the above-mentioned core material, the functional group having the charge can be introduced onto the surface of the core material by a chemical bond by the method exemplified below. However, the core material having the charge on its surface requires only to have at least the charge on its surface, and it is therefore required only that at least the functional group having the charge exists on the surface of the core material. Accordingly, it should not be construed as being limited to the method exemplified below.

As the method for introducing the core material having the charge on its surface onto the surface of the pigment (core material) by the chemical bond, there is a method of introducing an ionic group (anionic group in the following method) onto a surface of a pigment particle by chemical treatment. An example thereof will be shown below. First, the pigment particles are dispersed in a solvent such as sulfolane, N-methyl-2-pyrrolidone, dimethylacetamide, quinoline, hexamethylphosphoric triamide, chloroform, dichloroethane, tetrachloroethane, tetrachloroethylene, dichloromethane, nitromethane, nitrobenzene, liquid sulfur dioxide, carbon disulfide or trichlorofluoromethane, and a sulfur-containing compound such as sulfuric acid, fuming sulfuric acid, sulfur trioxide, chlorosulfuric acid, fluorosulfuric acid, amidosulfuric acid, a sulfonated pyridine salt or sulfamic acid is added to the resulting dispersion to conduct reaction by heating at 60 to 200° C. with stirring for 3 to 10 hours, thereby being able to introduce a sulfone group onto the surface of the pigment particle. Then, washing with water, ultrafiltration, reverse osmosis, centrifugation and the like are performed to remove the solvent and unreacted products, thereby being able to obtain the pigment particle having the sulfone group (ionic group) on its surface.

Ionic Polymerizable Surfactant

The ionic polymerizable surfactant used in the invention may be either cationic or anionic, and is appropriately selected depending on the charge of the surface of the core material. For example, when the charge of the surface of the core material is a negative charge, a cationic polymerizable surfactant is selected as the ionic polymerizable surfactant.

The ionic polymerizable surfactant is an ionic surfactant having an ionic group, a hydrophobic group and further a polymerizable group. The polymerizable group is preferably a radically polymerizable unsaturated hydrocarbon group, and specifically, it is preferably a group selected from the group consisting of a vinyl group, an allyl group, an acryloyl group, a methacryloyl group, a propenyl group, a vinylidene group and a vinylene group. Of these, an allyl group, a methacryloyl group and an acryloyl group are particularly preferred. The ionic polymerizable surfactant is called either an anionic polymerizable surfactant or a cationic polymerizable surfactant, depending on whether it has an anionic group or a cationic group.

Cationic Polymerizable Surfactant

As the cationic group contained in the cationic polymerizable surfactant, preferred is a cationic group selected from the group consisting of a primary ammonium cation, a secondary ammonium cation, a tertiary ammonium cation and a quaternary ammonium cation. The primary ammonium cations include a monoalkylammonium cation ($RNH_3^+$), the secondary ammonium cations include a dialkylammonium cation ($R_2NH_2^+$), the tertiary ammonium cations include a trialkylammonium cation ($R_3NH^+$), and the quaternary ammonium cations include $R_4NH^+$. R as used herein is a hydrophobic group or a polymerizable group, which includes the following. The hydrophobic group is preferably one or two or more selected from the group consisting of an alkyl group having 8 to 16 carbon atoms and an aryl group such as a phenyl group or a phenylene group, and may also have both the alkyl group and the aryl group in its molecule. Counter anions of the above-mentioned cationic groups include $Cl^-$, $Br^-$, $I^-$, $CH_3OSO_3^-$ and $C_2H_5OSO_3^-$.

The cationic polymerizable surfactants include, for example, a compound represented by the general formula $R_{[4-(1+m+n)]}R^1{}_1R^2{}_mR^3{}_nN^+.X^-$ (wherein R is a polymerizable group, $R^1$, $R^2$ and $R^3$ are each an alkyl group having 8 to 16 carbon atoms or an aryl group such as a phenyl group or a phenylene group, $X^-$ is $Cl^-$, $Br^-$, $I^-$, $CH_3OSO_3^-$ or $C_2H_5OSO_3^-$, and l, m and n are each 1 or 0). The polymerizable groups as used herein include ones described above.

Specific examples of the cationic polymerizable surfactants include methacrylic acid dimethylaminoethyloctyl chloride, methacrylic acid dimethylaminoethylcetyl chloride, methacrylic acid dimethylaminoethyldecyl chloride, methacrylic acid dimethylaminoethyldodecyl chloride, methacrylic acid dimethylaminoethyltetradecyl chloride and methacrylic acid dimethylaminoethylbenzyl chloride. The cationic polymerizable surfactants exemplified above can be used either alone or as a mixture of two or more thereof.

Anionic Polymerizable Surfactant

The anionic polymerizable surfactant is an anionic surfactant having the above-mentioned anionic group, the above-mentioned hydrophobic group and further the above-mentioned polymerizable group.

Specific examples of the anionic polymerizable surfactants include anionic allyl derivatives as described in JP-B-49-46291, JP-B-1-24142 and JP-A-62-104802, anionic propenyl derivatives as described in JP-A-62-221431, anionic acrylic acid derivatives as described in JP-A-62-34947 and JP-A-55-11525, and anionic itaconic acid derivatives as described in JP-B-46-34898 and JP-A-51-30284.

As the anionic polymerizable surfactant used in the invention, preferred is, for example, a compound represented by the following general formula (31):

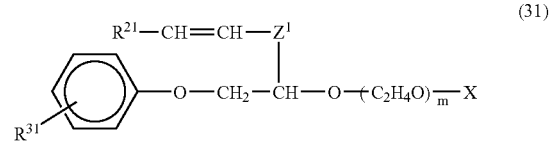

wherein $R^{21}$ and $R^{31}$ are each independently a hydrogen atom or a hydrocarbon group having 1 to 12 carbon atoms; $Z^1$ is a group represented by a carbon-carbon single bond or $—CH_2—O—CH_2—$; m is an integer of 2 to 20; and X is a group represented by formula $—SO_3M^1$, wherein $M^1$ is an alkali metal, an ammonium salt or an alkanolamine; or, for example, a compound represented by the following general formula (32):

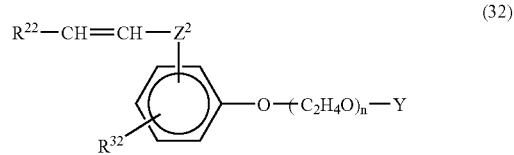

wherein $R^{22}$ and $R^{32}$ are each independently a hydrogen atom or a hydrocarbon group having 1 to 12 carbon atoms; $Z^2$ is a group represented by a carbon-carbon single bond or $—CH_2—O—CH_2—$; n is an integer of 2 to 20; and Y is a group represented by formula $—SO_3M^2$, wherein $M^2$ is an alkali metal, an ammonium salt or an alkanolamine.

The anionic polymerizable surfactants represented by the above-mentioned formula (31) include compounds described in JP-A-5-320276 and JP-A-10-316909. By appropriately adjusting the value of m in formula (31), it is possible to adjust the hydrophilicity of the surface of the encapsulated colorant particle obtained by encapsulating the colorant particle. Preferred examples of the polymerizable surfactants represented by formula (31) include a compound represented by the following formula (310), and specific examples thereof include compounds represented by the following formulas (31a) to (31d):

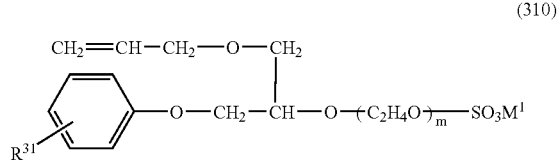

wherein $R^{31}$, m and $M^1$ have the same meanings as given for the compound represented by formula (31);

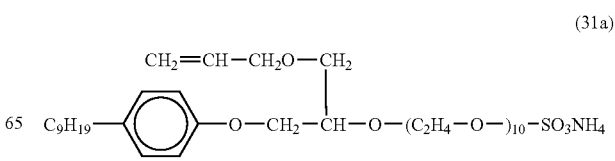

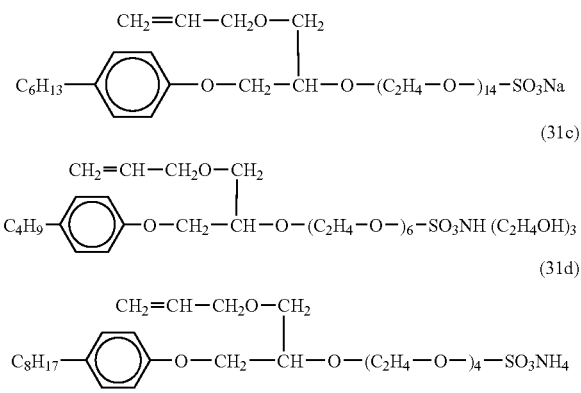

(31b)

(31c)

(31d)

As the above-mentioned anionic polymerizable surfactants, there can also be used commercially available products. Adeka Reasoap SE-10N supplied from Asahi Denka Co., Ltd. is a compound in which $M^1$ is $NH_4$, $R^{31}$ is $C_9H_{19}$ and m is 10 in the compound represented by formula (310). Adeka Reasoap SE-20N supplied from Asahi Denka Co., Ltd. is a compound in which $M^1$ is $NH_4$, $R^{31}$ is $C_9H_{19}$ and m is 20 in the compound represented by formula (310).

Further, as the anionic polymerizable surfactants used in the invention, preferred is, for example, a compound represented by general formula (33):

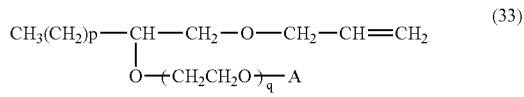

(33)

wherein p is 9 or 11; q is an integer of 2 to 20; and A is a group represented by $—SO_3M^3$, wherein $M^3$ is an alkali metal, an ammonium salt or an alkanolamine. Preferred examples of the anionic polymerizable surfactants represented by formula (33) include the following compound:

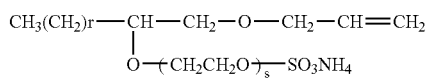

wherein r is 9 or 11; and s is 5 or 10.

As the above-mentioned anionic polymerizable surfactants, there can also be used commercially available products. The commercially available products include, for example, Aqualon KH series (Aqualon KH-5 and Aqualon KH-10) (the above are trade names) supplied from Daiichi Kogyo Yakuhin Co., Ltd. Aqualon KH-5 is a mixture of a compound in which r is 9 and s is 5, and a compound in which r is 11 and s is 5, in the compound represented by the above-mentioned formula (33). Aqualon KH-10 is a mixture of a compound in which r is 9 and s is 10, and a compound in which r is 11 and s is 10, in the compound represented by the above-mentioned formula.

Further, as the anionic polymerizable surfactant used in the invention, preferred is a compound represented by the following formula (34):

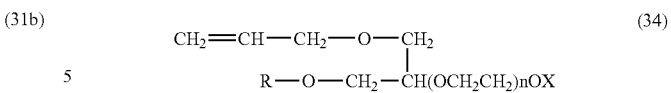

(34)

wherein R is an alkyl group having 8 to 15 carbon atoms; n is an integer of 2 to 20, X is a group represented by $—SO_3B$; and B is an alkali metal, an ammonium salt or an alkanolamine.

As the above-mentioned anionic polymerizable surfactants, there can also be used commercially available products. The commercially available products include, for example, Adeka Reasoap SR series (Adeka Reasoap SR-10, SR-20 and SR-1025) (the above are trade names) supplied from Asahi Denka Co., Ltd. The Adeka Reasoap SR series are compounds in which B is represented by $NH_4$ in the above-mentioned general formula (34). SR-10 is a compound in which n is 10, and SR-20 is a compound in which n is 20.

Furthermore, as the anionic polymerizable surfactant used in the invention, there can also be used a compound represented by the following formula (A):

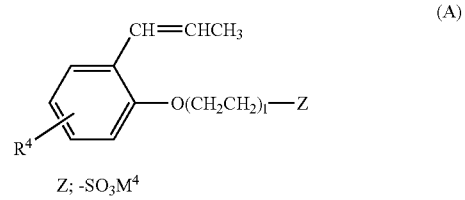

(A)

Z; $-SO_3M^4$ wherein $R^4$ represents a hydrogen atom or a hydrocarbon group having 1 to 12 carbon atoms; l represents a number of 2 to 20; and $M^4$ represents an alkali metal, an ammonium salt or an alkanolamine.

As the above-mentioned anionic polymerizable surfactants, there can also be used commercially available products. The commercially available products include, for example, Aqualon HS series (Aqualon HS-10, HS-20 and HS-1025) (the above are trade names) supplied from Daiichi Kogyo Yakuhin Co., Ltd.

Further, the anionic polymerizable surfactants used in the invention include, for example, a sodium alkylallylsulfosuccinate represented by general formula (35):

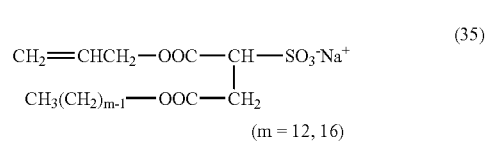

(35)

(m = 12, 16)

As the above-mentioned anionic polymerizable surfactants, there can also be used commercially available products. The commercially available products include, for example, Eleminol JS-2 supplied from Sanyo Chemical Industries, Ltd., which is a compound in which m is 12 in the above-mentioned general formula (35).

Further, the anionic polymerizable surfactants used in the invention include, for example, methacryloyloxypolyoxyalylene sulfuric ester sodium salt represented by general formula (36). In the following formula, n is from 1 to 20.

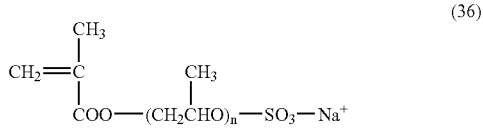

(36)

As the above-mentioned anionic polymerizable surfactants, there can also be used commercially available products. The commercially available products include, for example, Eleminol RS-30 supplied from Sanyo Chemical Industries, Ltd., which is a compound in which n is 9 in the above-mentioned general formula (36).

Further, as the anionic polymerizable surfactants used in the invention, there can be used, for example, a compound represented by general formula (37):

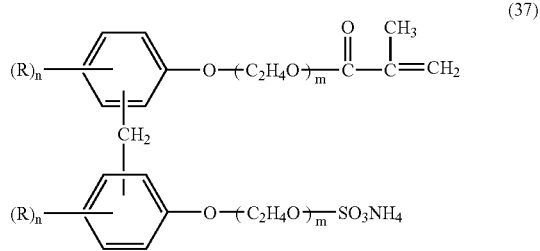

(37)

As the above-mentioned anionic polymerizable surfactants, there can also be used commercially available products, to which Antox MS-60 supplied from Nippon Nyukazai Co., Ltd. corresponds.

The anionic polymerizable surfactants exemplified above can be used either alone or as a mixture of two or more thereof.

Ionic Monomer

The ionic monomer used in the invention is a compound having an ionic group and a polymerizable group, and a water-soluble compound. The ionic group and the polymerizable group are the same as described above. The ionic monomer is called either an anionic monomer (anionic water-soluble monomer) or a cationic monomer (cationic water-soluble monomer), depending on whether it has an anionic group or a cationic group as the ionic group.

Preferred specific examples of the cationic monomers which can be used in the invention include a neutralized salt of dimethylaminomethyl acrylate, dimethylaminoethyl acrylate, dimethylaminopropyl acrylate, diethylaminomethyl acrylate, diethylaminoethyl acrylate, diethylaminopropyl acrylate, dimethylaminomethyl acrylamide, dimethylaminoethyl acrylamide, dimethylaminopropyl acrylamide, diethylaminomethyl acrylamide, diethylaminoethyl acrylamide, diethylaminopropyl acrylamide, diisopropylaminomethyl acrylamide, diisopropylaminoethyl acrylamide, diisopropylaminopropyl acrylamide, dimethylaminomethyl methacrylate, dimethylaminoethyl methacrylate, dimethylaminopropyl methacrylate, diethylaminomethyl methacrylate, diethylaminoethyl methacrylate, diethylaminopropyl methacrylate, dimethylaminomethyl methacrylamide, dimethylaminoethyl methacrylamide, dimethylaminopropyl methacrylamide, diethylaminomethyl methacrylamide, diethylaminoethyl methacrylamide, diethylaminopropyl methacrylamide, diisopropylaminomethyl methacrylamide, diisopropylaminoethyl methacrylamide or diisopropylaminopropyl methacrylamide with a hydrogen halide, sulfuric acid, nitric acid or an organic acid, and a quaternized product with an alkyl halide, benzyl halide, dimethylsufluric acid or diethylsulfuric acid. Of these, dimethylaminoethyl methacrylate methyl chloride, methacryloyloxyethyltrimethylammonium chloride, diallyldimethylammonium chloride and 2-hydroxy-3-methacryloxypropyltrimethylammonium chloride are preferably used. As the above-mentioned cationic monomers, there can also be used commercially available products, and examples thereof include Acryester DMC (Mitsubishi Rayon Co., Ltd.), Acryester DML60 (Mitsubishi Rayon Co., Ltd.) and C-1615 (Daiichi Kogyo Yakuhin Co., Ltd.). The cationic monomers exemplified above can be used either alone or as a mixture of two or more thereof.

As the anionic monomers which can be used in the invention, there are a carboxyl group-containing monomer, a sulfonic acid group-containing monomer and a phosphone group-containing monomer. Specific examples of the carboxyl group-containing monomers include acrylic acid, methacrylic acid, 2-acryloyloxyethylsuccinic acid, 2-acryloyloxyethylphthalic acid, 2-methacryloyloxyethylsuccinic acid, 2-methacryloyloxyethylphthalic acid, itaconic acid, fumaric acid, maleic acid and a metal salt such as an alkali metal salt or an alkali earth metal salt or an ammonium salt thereof. Of these, preferred are acrylic acid, methacrylic acid and a metal salt such as an alkali metal salt or an alkali earth metal salt or an ammonium salt thereof. The sulfonic acid-group containing monomers include, for example, 4-styrenesulfonic acid, vinylsulfonic acid, sulfoethyl acrylate, sulfoethyl methacrylate, sulfoalkyl acrylate, sulfoalkyl methacrylate, sulfopropyl acrylate, sulfopropyl methacrylate, sulfoaryl acrylate, sulfoaryl methacrylate, 2-acrylamidoethanesulfonic acid, butylacrylamidosulfonic acid, 2-acrylamido-2-methylpropanesulfonic acid, allylsulfonic acid, methacrylsulfonic acid, 2-acryloyloxyethanesulfonic acid, 3-acryloyloxypropanesulfonic acid, 4-acryloyloxybutanesulfonic acid, 2-methacryloyloxyethanesulfonic acid, 3-methacryloyloxyethanesulfonic acid, 4-methacryloyloxyethanesulfonic acid and a metal salt such as an alkali metal salt or an alkali earth metal salt or an ammonium salt thereof. Further, the phosphone group-containing monomers include a phosphoric acid group-containing (meth)acrylate such as phosphoethyl methacrylate. The anionic monomers exemplified above can be used either alone or as a mixture of two or more thereof.

The ionic group-, hydrophobic group- and polymerizable group-containing ionic polymerizable surfactant having the charge opposite to the surface charge of the core material having the charge on its surface and/or the ionic hydrophilic monomer having the charge opposite to the surface charge of the core material having the charge on its surface are added preferably in an amount ranging from a 0.5-fold to 2-fold mole excess, and more preferably in an amount ranging from a 0.8-fold to 1.2-fold mole excess, based on the total number of moles of the ionic group determined from the ionic group on the surface of the core material having the charge on its surface and the amount thereof used (=the weight (g) of the core material used×the ionic group (mol/g) on the surface of the core material). By adjusting the amount of the ionic hydrophilic monomer added to at least a 0.5-fold mole excess, it is statically strongly adsorbed by the core material particle, and encapsulation easily becomes possible. By adjusting the amount thereof added to at most a 2-fold mole excess, the generation of the first ionic polymerizable surfactant and/or first ionic monomer not adsorbed by the core material particle can be reduced, and the generation of a polymer particle having no core material in a core (a particle composed of only the polymer) can be prevented.

Hydrophobic Monomer

The hydrophobic monomer as used in the invention means a polymerizable monomer having at least a hydrophobic group and a polymerizable group in its structure, and there can be exemplified one in which the hydrophobic group is selected from the group consisting of an aliphatic hydrocarbon group, an alicyclic hydrocarbon group and an aromatic hydrocarbon group. The above-mentioned aliphatic hydrocarbon groups include a methyl group, an ethyl group and a propyl group, the alicyclic hydrocarbon groups include a cyclohexyl group, a dicyclopentenyl group, a dicyclopentanyl group and an isobornyl group, and the aromatic hydrocarbon groups include a benzyl group, a phenyl group and a naphthyl group. As the polymerizable group of the above-mentioned hydrophobic monomer, there can be used the same group as described in the item of the above-mentioned ionic polymerizable surfactant.

Specific examples of the hydrophobic monomers include styrene derivatives such as styrene, methylstyrene, vinyltoluene, dimethylstyrene, chlorostyrene, dichlorostyrene, t-butylstyrene, bromostyrene and p-chloromethylstyrene; monofunctional acrylic esters such as methyl acrylate, ethyl acrylate, isopropyl acrylate, n-butyl acrylate, butoxyethyl acrylate, isobutyl acrylate, n-amyl acrylate, isoamyl acrylate, n-hexyl acrylate, octyl acrylate, decyl acrylate, dodecyl acrylate, octadecyl acrylate, benzyl acrylate, phenyl acrylate, phenoxyethyl acrylate, cyclohexyl acrylate, dicyclopentanyl acrylate, dicyclopentenyl acrylate, dicyclopentenyloxyethyl acrylate, tetrahydrofurfuryl acrylate, isobornyl acrylate, lauryl acrylate, stearyl acrylate, behenyl acrylate, isooctyl acrylate, isomyristyl acrylate, isostearyl acrylate and 2-ethylhexyldiglycol acrylate; monofunctional methacrylic esters such as methyl methacrylate, ethyl methacrylate, isopropyl methacrylate, n-butyl methacrylate, i-butyl methacrylate, t-butyl methacrylate, n-amyl methacrylate, isoamyl methacrylate, n-hexyl methacrylate, 2-ethylhexyl methacrylate, lauryl methacrylate, tridecyl methacrylate, stearyl methacrylate, isodecyl methacrylate, octyl methacrylate, decyl methacrylate, dodecyl methacrylate, octadecyl methacrylate, benzyl methacrylate, phenyl methacrylate, phenoxyethyl methacrylate, cyclohexyl methacrylate, tetrahydrofurfuryl methacrylate, t-butylcyclohexyl methacrylate, behenyl methacrylate, dicyclopentanyl methacrylate, dicyclopentenyl methacrylate, dicyclopentenyloxyethyl methacrylate and isobornyl methacrylate; allyl compounds such as allylbenzene, allyl-3-cyclohexane propionate, 1-allyl-3,4-dimethoxybenzene, allyl phenoxyacetate, allyl phenylacetate, allylcyclohexane and an allyl multivalent carboxylate; unsaturated esters of fumaric acid, maleic acid and itaconic acid; and radically polymerizable group-containing monomers such as an N-substituted maleimide and a cyclic olefin.

The physical characteristics and chemical characteristics of the encapsulated matter of the invention, as well as the strength of the coating film, chemical resistance, water resistance, light resistance, weather resistance and optical characteristics, are determined by the structure of the hydrophobic monomer and the structure of a copolymer comprising the hydrophobic monomer. It is therefore possible to select the hydrophobic monomer, depending on the performance required for the encapsulated matter. For example, it is possible to obtain the fixability and abrasion resistance of recorded matter required at the time when the encapsulated matter of the invention is used as the recording medium, by controlling the glass transition temperature (Tg) of the copolymer with which the colorant particles are coated. In general, when a solid polymer, particularly an amorphous solid polymer, is elevated in temperature from low temperature to thigh temperature, the phenomenon occurs that a state in which very large force is required for slight deformation (glass state) is rapidly changed to a state in which large deformation occurs by small force. The temperature at which this phenomenon occurs is called the glass transition point (or the glass transition temperature). Usually, in a differential thermal curve obtained by temperature rise measurement with a differential scanning calorimeter, the temperature at an intersection of a tangential line drawn from a bottom of an endothermic peak to an initiation point of endotherm and a base line is taken as the glass transition point. Further, it is known that other physical properties such as the elastic modulus, the specific heat and the refractive index also rapidly change at the glass transition point, and it is known that the glass transition point is also determined by measuring these physical properties. Furthermore, the glass transition point can be calculated from the weight fraction of the monomer used in synthesizing the copolymer and the glass transition point of a homopolymer obtained by homopolymerizing the monomer, by the Fox equation. In the invention, there has been used the glass transition point obtained by the Fox equation. That is to say, when the temperature environment in which the encapsulated matter of the invention is placed is higher than the glass transition point of the copolymer with which the core material of the encapsulated matter of the invention is coated, this copolymer goes into a state in which large deformation occurs by small force, and further melts when it reaches the melting point. At this time, when another encapsulated matter exists in the vicinity thereof, the encapsulated matters are fusion bonded to each other to form a film. Further, even in cases where the environmental temperature does not reach the melting point, when the encapsulated matters come into contact with each other by strong force under such conditions that it becomes possible that molecules of the copolymers with which the respective encapsulated matters are coated are entangled with each other, the copolymers with which the encapsulated matters are coated are fusion bonded to each other in some cases.

In cases where the encapsulated matter of the invention using the colorant as the core material is used as an inkjet ink, when the ink is printed on a recording medium such as plain paper or an exclusive medium for inkjet recording, water and/or an aqueous medium comprising a water-soluble organic solvent around the encapsulated matter particles of the invention penetrate into the plain paper or the exclusive medium for inkjet recording, thereby disappearing from the vicinities of the encapsulated matter particles to cause them to come close to one another. In that case, when the glass transition point (Tg) of the copolymer with which the colorant particles which are the core material of the encapsulated matter particles are coated is equal to or lower than room temperature, the copolymer with which the colorant particles are coated is fusion bonded by capillary pressure generated in the clearance between the encapsulated matter particles to form a film in a state in which the colorant particles are encapsulated (included) inside, thereby being able to obtain the fixability of the colorant to the recording medium and abrasion resistance. In this case, when the glass transition point (Tg) of the copolymer with which the colorant particles of the encapsulated matter of the invention are coated is preferably 30° C. or lower, more preferably 15° C. or lower, and still more preferably 10° C. or lower, the encapsulated matter is more preferably film-formed at room temperature. Accordingly, when the encapsulated matter of the invention using the colorant as the core material is used as the inkjet ink, it is preferred that the copolymer with which the colorant particles of the encapsulated matter is designed so as to have a glass transition point of 30° C. or lower. More preferably, the copolymer is designed so as to have a glass transition point of 15° C. or lower, and still more preferably, 10° C. or lower. However, when the glass transition point is lower than −20° C., solvent resistance tends to decrease. Accordingly, care should be taken. As the hydrophobic monomer, there is appropriately selected one satisfying the respective required characteristics described above, and the amount thereof added is arbitrarily determined.

Other Polymerizable Components

The encapsulated matter of the invention is one in which the core material is coated with the polymer, and in addition to the above, the other polymerizable monomer components can be used within the range not impairing the effect of the invention. The other polymerizable monomers used in the invention include, for example, a crosslinkable monomer. The mechanical strength and heat resistance of the polymer can be enhanced by copolymerizing the crosslinkable monomer with the hydrophobic monomer to improve the shape retention of a capsule wall material. Further, the swelling of the polymer caused by an organic solvent or the penetration of an organic solvent into the inside of the polymer can be inhibited to enhance the solvent resistance of the capsule wall material. This can also enhance, for example, in an ink composition for inkjet recording in which a water-soluble organic solvent coexists, the dispersibility of the colorant particles, the storage stability of the ink composition, and further ejection properties of the ink composition from an inkjet head. The crosslinkable monomers used in the invention include one having a compound having two or more unsaturated hydrocarbon groups of at least one kind selected from the group consisting of a vinyl group, an allyl group, an acryloyl group, a methacryloyl group, a propenyl group, a vinylidene group and a vinylene group. Specific examples of the crosslinkable monomers include, for example, ethylene glycol diacrylate, diethylene glycol diacrylate, triethylene glycol diacrylate, tetraethylene glycol diacrylate, polyethylene glycol diacrylate, allyl acrylate, bis(acryloxyethyl)hydroxyethyl isocyanurate, bis(acryloxyneopentyl glycol) adipate, 1,3-butylene glycol diacrylate, 1,6-hexanediol diacrylate, neopentyl glycol diacrylate, propylene glycol diacrylate, polypropylene glycol diacrylate, 2-hydroxy-1,3-diacryloxypropane, 2,2-bis[4-(acryloxy)phenyl]propane, 2,2-bis[4-(acryloxyethoxy)phenyl]propane, 2,2-bis[4-(acryloxyethoxydiethoxy)phenyl]propane, 2,2-bis[4-(acryloxyethoxypolyethoxy)phenyl]propane, hydroxy pivalic acid neopentyl glycol diacrylate, 1,4-butanediol diacrylate, dicyclopentanyl diacrylate, dipentaerythritol hexaacrylate, dipentaerythritol monohydroxypentaacrylate, ditrimethylolpropane tetraacrylate, pentaerythritol triacrylate, tetrabromobisphenol A diacrylate, triglycerol diacrylate, trimethylolpropane triacrylate, tris(acryloxyethyl) isocyanurate, ethylene glycol dimethacrylate, diethylene glycol dimethacrylate, triethylene glycol dimethacrylate, tetraethylene glycol dimethacrylate, polyethylene glycol dimethacrylate, propylene glycol dimethacrylate, polypropylene glycol dimethacrylate, 1,3-butylene glycol dimethacrylate, 1,4-butanediol dimethacrylate, 1,6-hexanediol dimethacrylate, neopentyl glycol dimethacrylate, 2-hydroxy-1,3-dimethacryloxypropane, 2,2-bis[4-(methacryloxy)phenyl]propane, 2,2-bis[4-(methacryloxyethoxy)phenyl]propane, 2,2-bis[4-(methacryloxyethoxydiethoxy)phenyl]propane, 2,2-bis[4-(methacryloxyethoxypolyethoxy)phenyl]propane, tetrabromobisphenol A dimethacrylate, dicyclopentanyl dimethacrylate, dipentaerythritol hexamethacrylate, glycerol dimethacrylate, hydroxy pivalic acid neopentyl glycol dimethacrylate, dipentaerythritol monohydroxypentamethacrylate, ditrimethylolpropane tetramethacrylate, pentaerythritol trimethacrylate, pentaerythritol tetramethacrylate, triglycerol dimethacrylate, trimethylolpropane trimethacrylate, tris(methacryloxyethyl) isocyanurate, allyl methacrylate, divinylbenzene, diallyl phthalate, diallyl terephthalate, diallyl isophthalate and diethylene glycol bisallyl carbonate.

When the above-mentioned crosslinkable monomer is used, the above-mentioned advantages are obtained. On the other hand, when it is used in large amounts, the plasticity of the capsule wall material polymer decreases, which is liable to cause poor adhesion with the medium such as the recording medium. In this case, for example, when used in the inkjet recording ink, it becomes difficult to be fixed onto the recording medium such as paper or the exclusive medium for inkjet recording in some cases, and the problem of deteriorating the abrasion resistance of images may also be encountered. It is therefore preferred that the amount of the crosslinkable monomer used is appropriately adjusted in view of the characteristics required for the encapsulated matter.

Polymerization Initiator

As described above, the polymer constituting the wall material of the encapsulated matter of the present invention can be obtained by polymerization of the ionic polymerizable surfactant, the ionic monomer, the hydrophobic monomer. This polymerization reaction may be carried out using a known polymerization initiator. Particularly, it is preferred to use a radical polymerization initiator. In the present invention, it is preferred to use a polymerization initiator which is suitable for the polymerization method employed in producing the encapsulated matter. In the case of employing an emulsion polymerization process and a miniemulsion polymerization process, the polymerization initiator is preferably a water-soluble polymerization initiator. Examples thereof include, for example, persulfates such as potassium pesulfate, ammonium persulfate and sodium persulfate, hydrogen peroxide, and water-soluble azo compound-based initiators such as 2,2-azobis(2-methylpropionamidine) dihydrochloride and 4,4-azobis (4-cyanovaleric acid). There can be also used a redox type initiator in which an oxidizing agent such as potassium persulfate, ammonium persulfate, sodium persulfate, hydrogen peroxide or the like, is combined with a reducing agent such as sodium sulfite, sodium hyposulfite, ferrous sulfate, ferrous nitrate, thiourea or the like. Further, in the case of employing a suspension polymerization process and a miniemulsion polymerization process, it is preferred to use an oil-soluble polymerization initiator, such as an oil-soluble azo compound-based initiator, e.g., dimethyl-2,2'-azobis(2-methylpropionate), 2,2'-azobis(2,4-dimethylvaleronitrile) and 2,2'-azobis(2-methylbutyronitrile), and a peroxide, e.g., dilauroyl peroxide, disuccinic acid peroxide, 1,1,3,3-tetramethylbutyl(peroxy-2-ethylhexanoate), 2,5-dimethyl-2,5-di(2-ethahexanoylperoxy)hexane.

Other Components

The encapsulated matter of the invention is one in which the core material is coated with the material mainly comprising the polymer, and can be allowed to contain other components such as an ultraviolet absorber, a light stabilizer, an antioxidant, a flame retardant, a plasticizer and wax in the polymer.

Production Process

The encapsulated matter according to the embodiment of the invention is suitably produced, specifically, by the following procedures.

(1) To a dispersion in which a core material having a charge on a surface thereof is dispersed in water, there are added an ionic group-, hydrophobic group- and polymerizable group-containing ionic polymerizable surfactant A and/or an ionic monomer, each having a charge opposite to the surface charge of the core material, followed by mixing. The ionic group of the ionic polymerizable surfactant A and/or the ionic monomer is electrostatically adsorbed herein by the core material having the charge on its surface, thereby being immobilized. (2) After the step of the above (1), a hydrophobic monomer is added, followed by mixing. (3) After the step of the above (2), an ionic polymerizable surfactant B having a charge of the same kind as or opposite to the surface charge of the core material and an ionic hydrophilic monomer having a charge of the same kind as that of the ionic polymerizable surfactant B are added, followed by mixing. (4) Following the step of the above (3), a polymerization initiator is added thereto to conduct polymerization. Thus, primary encapsulated particles (encapsulated particles in which the core material is coated with one polymer layer) are obtained. Then, (5) an ionic group-, hydrophobic group- and polymerizable group-containing ionic polymerizable surfactant C and/or an ionic monomer, each having a charge opposite to that of the ionic group on a surface of the resulting primary encapsulated particle are added, followed by mixing. The ionic group of the ionic polymerizable surfactant C and/or the ionic monomer is electrostatically adsorbed herein by the primary encapsulated particle having the charge on its surface, thereby being immobilized. (6) After the step of the above (5), a hydrophobic monomer is added, followed by mixing. (7) After the step of the above (6), an ionic group-, hydrophobic group- and polymerizable group-containing ionic polymerizable surfactant D having a charge of the same kind as or opposite to that of the ionic group on the surface of the encapsulated particle obtained above and an ionic hydrophilic monomer having a charge of the same kind as that of the ionic polymerizable surfactant D are added, followed by mixing. (8) Following the step of the above (7), a polymerization initiator is added thereto to conduct polymerization. Thus, secondary encapsulated particles (encapsulated particles in which the core material is coated with two polymer layers) are obtained. Similarly, a third or subsequent polymer layer can also be formed.

Further, according to another process, (1) to a dispersion in which a core material having a charge on a surface thereof is dispersed in water, there are added an ionic group-, hydrophobic group- and polymerizable group-containing ionic polymerizable surfactant A and/or an ionic monomer, each having a charge opposite to the surface charge of the core material, followed by mixing. The ionic group of the ionic polymerizable surfactant A and/or the ionic monomer is electrostatically adsorbed herein by the core material having the charge on its surface, thereby being immobilized. (2') After the step of the above (1), an ionic polymerizable surfactant B having a charge of the same kind as or opposite to the surface charge of the core material and an ionic hydrophilic monomer having a charge of the same kind as that of the ionic polymerizable surfactant B are added, followed by mixing. (3') After the step of the above (2'), a hydrophobic monomer is added, followed by mixing. (4) Following the step of the above (3'), a polymerization initiator is added thereto to conduct polymerization. Thus, primary encapsulated particles (encapsulated particles in which the core material is coated with one polymer layer) are obtained. Then, (5) an ionic group-, hydrophobic group- and polymerizable group-containing ionic polymerizable surfactant C and/or an ionic monomer, each having a charge opposite to that of the ionic group on a surface of the resulting primary encapsulated particle are added, followed by mixing. The ionic group of the ionic polymerizable surfactant C and/or the third ionic monomer is electrostatically adsorbed herein by the primary encapsulated particle having the charge on its surface, thereby being immobilized. (6') After the step of the above (5), an ionic group-, hydrophobic group- and polymerizable group-containing ionic polymerizable surfactant D having a charge of the same kind as or opposite to that of the ionic group on the surface of the primary encapsulated particle obtained above and an ionic hydrophilic monomer having a charge of the same kind as that of the fourth ionic polymerizable surfactant are added, followed by mixing. (7') After the step of the above (6'), a hydrophobic monomer is added, followed by mixing. (8) Following the step of the above (7'), a polymerization initiator is added thereto to conduct polymerization. Thus, secondary encapsulated particles (encapsulated particles in which the core material is coated with two polymer layers) are obtained. Similarly, a third or subsequent polymer layer can also be formed.

The encapsulated matter in which the core material is coated with two or more polymer layers can be suitably produced by such procedures. However, considering the reaction efficiency of polymerization, it is desirable to purify a product for every formation of each polymer layer and to form the subsequent layer after removal of impurities. However, it becomes complicated in process design, so that the subsequent layer may be continuously formed. Alternatively, purification may be performed only before the formation of an arbitrary layer.

Specific examples thereof will be shown below.

To the aqueous dispersion of the core material having the anionic group on its surface as the ionic group, there are added the cationic polymerizable surfactant and/or the cationic hydrophilic monomer, and water or water and an aqueous solvent are added as needed, followed mixing. After irradiation with an ultrasonic wave for a specified period of time, the anionic polymerizable surfactant and/or the anionic group-containing hydrophilic monomer and the hydrophobic monomer are added, followed by mixing. Water is further added, and irradiation with an ultrasonic wave is performed for a specified period of time, as needed. The temperature is elevated to a specified temperature (a temperature at which the polymerization initiator is activated) while performing ultrasonic irradiation and stirring as needed. Then, the polymerization initiator is added and activated to perform polymerization, thereby forming the first coating layer. Then, to the resulting aqueous dispersion of the primary encapsulated particles (encapsulated particles in which the core material is coated with one polymer layer), the cationic polymerizable surfactant and/or the cationic hydrophilic monomer are added, followed by mixing, by the same method as described above. Thereafter, the anionic polymerizable surfactant and/or the anionic group-containing hydrophilic monomer are added, and the polymerization initiator is added to perform polymerization, thereby forming the second coating layer. According to the above-mentioned procedures, there can be obtained the encapsulated matter in which the core material is coated in two layers with the polymer having a repeating structural unit derived from the cationic polymerizable surfactant and/or the cationic hydrophilic monomer, a repeating structural unit derived from the anionic polymerizable surfactant and/or the anionic group-containing hydrophilic monomer and a repeating structural unit derived from the hydrophobic monomer.

In the invention, water is used as the solvent for polymerization reaction, and ion exchanged water is used in some cases depending on the use of the encapsulated matter. In addition to water, for example, a water-soluble organic solvent such as a glycerol or a glycol may be contained as an arbitrary component.

When the core material having the charge on its surface is not dispersed in water, the above-mentioned steps are preferably executed after the core material has been dispersed in water as pretreatment before encapsulation using a general dispersing device such as a ball mill, a roll mill, an Eiger mill or a jet mill.

The polymerization initiator may be added collectively, dividedly or continuously at a temperature at which the polymerization initiator is activated. Further, after the addition of the polymerization initiator, the aqueous dispersion may be heated to a temperature at which the polymerization initiator is activated. In the invention, in emulsion polymerization and miniemulsion polymerization, the addition thereof can be suitably performed by dropping an aqueous solution obtained by dissolving a water-soluble polymerization initiator in ion exchanged water into the aqueous dispersion in a reaction vessel at a specified dropping rate. Further, when an oil-soluble polymerization initiator is used in suspension polymerization and miniemulsion polymerization, the addition thereof is suitably performed by adding it as such or adding as a solution obtained by dissolving it in a hydrophobic monomer. The activation of the polymerization initiator can be suitably performed by elevating it to a temperature at which the polymerization initiator is cleaved to generate an initiator radical. This attacks the polymerizable group of the ionic polymerizable surfactant, or the polymerizable group of the ionic hydrophilic monomer or the hydrophobic monomer, which causes polymerization reaction. Although the polymerization temperature and polymerization reaction time vary depending on the kind of polymerization initiator used and the kind of the above-mentioned polymerizable compound, it is easy to appropriately set preferred polymerization conditions. In general, the polymerization temperature is preferably within the range of 40° C. to 90° C., and the polymerization time is preferably within the range of 3 hours to 12 hours.

The polymerization reaction is preferably conducted using a reaction vessel equipped with a stirrer, a reflux condenser, a dropping funnel, a thermometer, a temperature controller and a nitrogen introducing unit, and an ultrasonic generator depending on the circumstances.

After the termination of the polymerization, it is preferred to adjust the pH to the range of 7.0 to 9.0 and to perform filtration, depending on the use.

The particle size of the encapsulated matter of the invention is not particularly limited.

When the encapsulated matter of the invention is used as an inkjet pigment ink, the particle size of the encapsulated matter of the invention is preferably 400 nm or less, more preferably 300 nm or less, and particularly preferably from 20 to 200 nm.

In the encapsulated matter of the invention, the glass transition points of the polymers forming the respective layers of at least two coating layers with which the core material is coated can be designed to different temperatures, respectively. For example, the film forming properties of the encapsulated matter is compatible with performances such as the strength and chemical resistance of the coating layers at a high level by forming an outermost layer by the polymer having a low glass transition point and an inner layer by the polymer having a high glass transition point. Further, in the encapsulated matter of the invention, the film forming properties of the encapsulated matter is also compatible with performances such as the strength and chemical resistance of the coating layers at a high level, for example, by introducing a crosslinked structure into the polymer of an inner layer using a crosslinkable monomer and forming an outermost layer by the polymer having a low glass transition point. Furthermore, the encapsulated matter having multiple polymer layers having high transparency can be obtained by decreasing the difference in the index of refraction between respective polymer layers. In addition, the average molecular weight of the polymer of an inner layer is increased by controlling the amount of the polymerization initiator added in forming the inner layer, or the polymerization chain length is adjusted to a short length using a chain transfer agent such as a mercaptan in forming an uppermost layer, thereby being able to form the inner layer having high strength and the surface layer which is flexible to the inner layer.

Aqueous Dispersion

The aqueous dispersion according to an embodiment of the invention contains the encapsulated matter according to the embodiment of the invention. The aqueous dispersion of the invention can be used in an inkjet recording ink, a water-based printing ink, a water-based paint, a water-based coating solution, a water-based hard coating solution, a water-based magnetic ink, a water-based conductive ink, a water-based conductive paint and the like by selecting the core material of the encapsulated matter depending on the use. In particular, when this aqueous dispersion is used in the inkjet recording ink, other compounding components for obtaining the inkjet recording ink are added by a conventional method, thereby being able to produce the inkjet recording ink according to an embodiment of the invention.

In particular, when the aqueous dispersion according to the embodiment of the invention is used in the inkjet recording ink, it is preferably subjected to purification treatment to use. Unreacted materials derived from the ionic polymerizable surfactant and/or the ionic monomer and the hydrophobic monomer are contained in this aqueous dispersion in some cases. When plain paper is used as the recording medium, the occurrence of blurring in images can be inhibited and the print density can be increased, while having good chroma saturation, by removing or decreasing these unreacted materials by ultrafiltration, centrifugal filtration or the like. Further, when the exclusive medium for ink jet recording, particularly a glossy medium for ink jet recording is used, good glossiness is obtained. After the purification treatment, the concentration of the ionic polymerizable surfactant and/or the ionic monomer and the hydrophobic monomer contained in the aqueous dispersion is preferably 50,000 ppm or less, and more preferably 10,000 ppm or less, based on the aqueous component. The term "aqueous component" as used herein means water and the water-soluble organic solvent contained in the aqueous dispersion. Further, "the ionic polymerizable surfactant and/or the ionic monomer and the hydrophobic monomer" as used herein mean ones which do not contribute to the formation of the coated polymer of the encapsulated pigment, of the ionic polymerizable surfactant and/or the ionic monomer and the hydrophobic monomer used for encapsulation in the invention, and include not only the ionic polymerizable surfactant and/or the ionic monomer and the hydrophobic monomer, but also an oligomer or polymer formed by polymerization reaction thereof and existing in the aqueous medium.

The concentrations of the ionic polymerizable surfactant and/or the ionic monomer and the hydrophobic monomer contained in the aqueous dispersion can be determined by quantitative analysis using liquid chromatography or gas chromatography. The contents of the ionic polymerizable surfactant and/or the ionic monomer and the oligomer or polymer formed by polymerization reaction thereof and existing in the aqueous medium can be determined by quantitative analysis according to liquid chromatography, and the content of the hydrophobic monomer can be determined by quantitative analysis according to gas chromatography. Depending on analysis conditions and the like, it is also possible to make quantitative analysis by liquid chromatography for the contents of the ionic polymerizable surfactant and/or the ionic monomer and the hydrophobic monomer and the oligomer or polymer formed by polymerization reaction thereof and existing in the aqueous medium.

Inkjet Recording Ink

When printing in black and white is performed, the inkjet recording ink used in the invention means a black ink, and when color printing is performed, it means a color ink, specifically a yellow ink, a magenta ink, a cyan ink, a green ink, a red ink, an orange ink or a violet ink, and further a black ink in some cases. In addition to these, there are also included a white ink, a fluorescent ink, a magnetic ink, a photochromic ink and a conductive ink.

The inkjet recording ink according to an embodiment of the invention contains the aqueous dispersion of the invention, as described above. The inkjet recording ink according to an embodiment of the invention contains at least the encapsulated matter according to the embodiment of the invention and water. Further, a solvent for the inkjet recording ink according to the embodiment of the invention preferably contains water and a water-soluble organic solvent as basic solvents, and can contain any other component as needed. The core material of the above-mentioned encapsulated matter is a colorant insoluble or slightly soluble in water, such as carbon black, an inorganic pigment, an organic pigment, a disperse dye or an oil-soluble dye. Further, a fluorescent material such as a fluorescent pigment or a fluorescent dye, magnetic material particles, a photochromic material and fine metal particles are also contained.

In particular, when a colorant such as a colorant insoluble or slightly soluble in water, such as carbon black, an inorganic pigment, an organic pigment, a disperse dye or an oil-soluble dye, is used as the core material of the encapsulated matter, the content of the encapsulated matter (encapsulate colorant) in the ink is preferably from 1 to 20% by weight, and more preferably from 3 to 20% by weight, based on the total weight of the ink. In particular, in order to obtain high print density and high color developability, it is preferably from 5 to 20% by weight. The use of the encapsulated colorant of the invention can provide low viscosity, high dispersibility and stable ejection properties, even when the colorant concentration is high.

The inkjet recording ink according to an embodiment of the invention preferably contains a wetting agent comprising a high boiling water-soluble organic solvent as the water-soluble organic solvent, in order to impart water retentivity and wetting properties to the inkjet recording ink. As such a high boiling water-soluble organic solvent, there can be exemplified a high boiling water-soluble organic solvent having a boiling point of 180° C. or higher. Specific examples of the water-soluble organic solvents having a boiling point of 180° C. or higher include ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycol having a molecular weight of 2,000 or less, 1,3-propylene glycol, isopropylene glycol, isobutylene glycol, 1,4-butanediol, 1,3-butanediol, 1,5-pentanediol, 1,6-hexanediol, 1,3-propanediol, 1,7-heptanediol, 1,8-octanediol, glycerol and pentaerythritol. The organic solvent having a boiling point of 200° C. or higher is particularly preferred. These can be used either alone or as a mixture of two or more thereof. This can provide the inkjet recording ink which retains flowability and re-dispersibility for a long period of time even when it is allowed to stand in an open state (a state in which the ink is in contact with air at room temperature). Further, clogging of nozzles becomes hard to occur during printing or on restarting after the interruption of printing, so that high ejection stability is obtained. In particular, in an embodiment of the inkjet recording ink of the invention, inclusion of glycerol can sufficiently secure the clogging reliability and storage stability of the ink. The content of these water-soluble organic solvents is preferably from about 10 to about 50% by weight, and more preferably from 10 to 30% by weight, based on the total weight of the inkjet recording ink.

Further, the water-soluble organic solvents include polar solvents such as 2-pyrrolidone, N-methylpyrrolidone, ε-caprolactam, dimethyl sulfoxide, sulfolane, morpholine, N-ethylmorpholine and 1,3-dimethyl-2-imidazolidinone, and one or more may be selected therefrom to use. The addition of these polar solvents is effective for more enhancing the dispersion stability of the encapsulated pigment, and more improves ejection stability of the ink. The content of these polar solvents is preferably from 0.1 to 20% by weight, and more preferably from 1 to 10% by weight, based on the total weight of the inkjet recording ink.

In order to accelerate penetration of the aqueous solvent into the recording medium, it is preferred that the inkjet recording ink according to an embodiment of the invention contains a penetrant. Prompt penetration of the aqueous solvent into the recording medium can surely provide recorded matter having images with less blurring. As the solvents (penetrants) used for such a purpose, there are preferably used an alkyl ether of a polyhydric alcohol (also referred to as a glycol ether) and a 1,2-alkyldiol. Specifically, the alkyl ethers of polyhydric alcohols include, for example, ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether and dipropylene glycol mono-n-butyl ether. The 1,2-alkyldiols specifically include, for example, 1,2-pentanediol and 1,2-hexanediol.

In particular, in the inkjet recording ink according to an embodiment of the invention, there are preferably used propylene glycol monobutyl ether, dipropylene glycol monobutyl ether, diethylene glycol monobutyl ether, triethylene glycol monobutyl ether, 1,2-pentanediol and 1,2-hexanediol. The total content of these penetrants is preferably from 1 to 20% by weight, and more preferably from 1 to 10% by weight, based on the total weight of the inkjet recording ink. When the content of the penetrant is less than 1% by weight, the penetrant has no effect on permeability. On the other hand, exceeding 20% by weight unfavorably results in easy occurrence of blurring to cause defects such as deterioration of print quality. Besides, the use of the 1,2-alkyldiol such as 1,2-pentanediol or 1,2-hexanediol remarkably improves drying properties of printed matter, and blurring in printed images. Further, inclusion of one or more compounds selected from the group consisting of an alkyl ether of a polyhydric alcohol and a 1,2-alkyldiol in the ink can enhance the rate of permeation of the ink solvent into the recording medium, so that images with very little blurring can be obtained even in printing on plain paper or recycled paper, coupled with the effect of the encapsulated pigment itself according to the embodiment of the invention, which causes print quality to be remarkably improved.

Further, it is preferred that the inkjet recording ink according to an embodiment of the invention contains a surfactant. When the surface of the encapsulated colorant according to an embodiment of the invention has an anionic group and/or a nonionic group, it is preferred that the inkjet recording ink contains an anionic surfactant and/or a nonionic surfactant. Specific examples of the anionic surfactants include an alkanesulfonate, an α-olefinsulfonate, an alkylbenzenesulfonate, an alkylnaphthalenesulfonic acid, an acylmethyltaurine acid, a dialkylsulfosuccinic acid, an alkylsulfuric ester salt, a sulfated oil, a sulfated olefin, a polyoxyethylene alkyl ether sulfuric ester salt, a fatty acid salt, an alkylsarcosine salt, an alkylphosphoric ester salt, a polyoxyethylene alkyl ether phosphoric ester salt and a monoglyceride phosphoric ester salt. Further, specific examples of the nonionic surfactants include a polyoxyethylene alkyl ether, a polyoxyethylene alkyl phenyl ether, a polyoxyethylene alkyl ester, a polyoxyethylene alkylamide, a glycerol alkyl ester, a sorbitan alkyl ester, a sugar alkyl ester, a polyhydric alcohol alkyl ether and an alkanolamine fatty acid amide.

More specifically, the anionic surfactants include sodium dodecylbenzenesulfonate, sodium laurate and an ammonium salt of a polyoxyethylene alkyl ether sulfate. Specific examples of the nonionic surfactants include ether surfactants such as polyoxyethylene nonyl phenyl ether, polyoxyethylene octyl phenyl ether, polyoxyethylene dodecyl phenyl ether, a polyoxyethylene alkyl allyl ether, polyoxyethylene oleyl ether, polyoxyethylene lauryl ether, a polyoxyethylene alkyl ether and a polyoxyalkylene alkyl ether; and ester surfactants such as polyoxyethylene oleic acid, polyoxyethylene oleic acid ester, polyoxyethylene distearic acid ester, sorbitan laurate, sorbitan monostearate, sorbitan monooleate, sorbitan sesquioleate, polyoxyethylene monooleate and polyoxyethylene stearate. When the surface of the encapsulated colorant according to an embodiment of the invention has a cationic group and/or a nonionic group, it is preferred that the inkjet recording ink contains a cationic surfactant and/or a nonionic surfactant. The cationic surfactants include a quaternary ammonium salt.

In particular, it is desirable that the inkjet recording ink according to an embodiment of the invention contains an acetylene glycol-based surfactant and/or an acetylene alcohol-based surfactant. This can further enhance the permeability of the aqueous solvent constituting the ink into the recording medium, which makes it possible to perform printing with little blurring on various recording media. It is possible to utilize commercial products commercially available as the acetylene glycol-based surfactants. Specific examples thereof include Surfynol 104, 82, 465, 485 and TG (all are available from Air Products and Chemicals, Inc.), and Olfine STG and Olfine E1010 (both are manufactured by Nissin Chemical Industry Co., Ltd.). The acetylene alcohol-based surfactants include Surfynol 61 (available from Air Products and Chemicals, Inc.). The content of these surfactants is preferably from 0.01 to 10% by weight, and more preferably from 0.1 to 5% by weight, based on the total weight of the inkjet recording ink.

Further, when the surface of the encapsulated colorant according to an embodiment of the invention has an anionic group, the pH of the inkjet recording ink according to an embodiment of the invention is adjusted preferably to the range of 7 to 11, and more preferably to the range of 8 to 9. As a pH adjuster, there is preferably used a basic compound. Furthermore, when the surface of the encapsulated colorant according to an embodiment of the invention has a cationic group, the pH is adjusted preferably to the range of 5 to 7, and more preferably to the range of 6 to 7. As a pH adjuster, there is preferably used an acidic compound. The basic compounds preferably used as the pH adjusters specifically include alkali metals such as sodium hydroxide, potassium hydroxide, lithium hydroxide, sodium carbonate, sodium hydrogencarbonate, potassium carbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate and potassium hydrogentartrate; ammonia; and amines such as methylamine, ethylamine, diethylamine, trimethylamine, triethylamine, tris(hydroxymethyl)aminomethane hydrochloride, triethanolamine, diethanolamine, diethylethanolamine, triisopropenolamine, butyldiethanolamine, morpholine and propanolamine. The acidic compounds preferably used as the pH adjusters specifically include sulfates such as sodium sulfate, potassium sulfate and ammonium sulfate.

Furthermore, for the purpose of mildewproofing, antisepsis or rust prevention, the inkjet recording ink according an embodiment of the invention may contain benzoic acid, dichlorophene, hexachlorophene, sorbic acid, a p-hydroxybenzoic ester, ethylenediaminetetraacetic acid (EDTA), sodium dehydroacetate, 1,2-benthiazoline-3-one (product name: Proxel XL manufactured by Avecia), 3,4-isothiazoline-3-one, 4,4-dimethyloxazolidine or the like. Besides, for the purpose of preventing nozzles of a recording head from being dried, the inkjet recording ink may contain urea, thiourea and/or ethylene urea.

The inkjet recording ink according to an embodiment of the invention contains at least (1) the encapsulated colorant according to the embodiment of the invention, (4) glycerol, and (5) water.

Such an inkjet recording ink is particularly excellent in dispersion stability and ejection stability, and further causes no clogging of the nozzles for a long period of time. Accordingly, stable printing is possible. Further, on the recording media such as plain paper, recycled paper and coated paper, there can be obtained high-quality images having high print density and excellent color developability. Furthermore, there can be obtained glossy images having no irregular reflection such as bronzing and excellent in image clarity and sharpness. In addition, fixability also becomes excellent.

The inkjet recording ink according to a preferred embodiment of the invention contains at least (1) the encapsulated colorant according to the embodiment of the invention, (2) at least one compound (penetrant) selected from the group consisting of diethylene glycol monobutyl ether, triethylene glycol monobutyl ether and/or an 1,2-alkyldiol having 4 to 10 carbon atoms, (4) glycerol, and (5) water.

Such an inkjet recording ink is particularly excellent in dispersion stability and ejection stability, and further causes no clogging of the nozzles for a long period of time. Accordingly, stable printing is possible. Further, on the recording media such as plain paper, recycled paper and coated paper, there can be obtained high-quality images having good drying properties after printing, no blurring, high print density and excellent color developability. Furthermore, a uniform film is formed to obtain a smooth film surface. Accordingly, there can be obtained glossy images having no irregular reflection such as bronzing and excellent in image clarity and sharpness. In addition, fixability also becomes excellent.

The inkjet recording ink according to another particularly preferred embodiment of the invention contains at least (1) the encapsulated colorant according to the embodiment of the invention, (2) at least one compound (penetrant) selected from the group consisting of diethylene glycol monobutyl ether, triethylene glycol monobutyl ether and/or an 1,2-alkyldiol having 4 to 10 carbon atoms, (3) the acetylene glycol-based surfactant and/or the acetylene alcohol-based surfactant, (4) glycerol, and (5) water.

In this embodiment, diethylene glycol monobutyl ether or triethylene glycol monobutyl ether of the above (2) as the penetrant is added preferably in an amount of 10% by weight or less, and more preferably in an amount of 0.5 to 5% by weight, based on the total weight of the ink composition. The addition of diethylene glycol monobutyl ether or triethylene glycol monobutyl ether exhibits the remarkable effect of improving penetrability, and also improves print quality. Further, the addition of diethylene glycol monobutyl ether and/or triethylene glycol monobutyl ether improves solubility of the acetylene glycol-based surfactant. Furthermore, the 1,2-alkylenediol having 4 to 10 carbon atoms of the above (2) as the penetrant is added preferably in an amount of 15% or less based on the total weight of the ink composition. Specifically, 1,2-pentanediol or 1,2-hexanediol is preferably used as the 1,2-alkyldiol. These can be used alone, or both can be used together. 1,2-Pentanediol is preferably added in an amount ranging from 3 to 15% by weight. Less than 3% by weight results in failure to obtain good penetrability. 1,2-Hexanediol is preferably added in an amount ranging from 0.5 to 10% by weight. Less than 0.5% by weight results in failure to obtain good penetrability.

Such an inkjet recording ink is particularly excellent in dispersion stability and ejection stability, and further causes no clogging of the nozzles for a long period of time. Accordingly, stable printing is possible. Further, on the recording media such as plain paper, recycled paper and coated paper, there can be obtained high-quality images having particularly good drying properties after printing, little blurring, high print density and excellent color developability. Furthermore, a more uniform film is formed to obtain a smooth film surface. Accordingly, there can be obtained glossy images having no irregular reflection such as bronzing and particularly excellent in image clarity and sharpness. In addition, fixability also becomes excellent. The acetylene glycol-based surfactant and/or the acetylene alcohol-based surfactant of the above (3) is added preferably in an amount of 0.01 to 10% by weight, and more preferably in an amount of 0.1 to 5% by weight, based on the total weight of the ink.

The colorant used in the conventional inkjet recording pigment ink has been generally dispersed in the ink, using a surfactant or a dispersant such as a polymer dispersant. Further, the encapsulated pigment obtained by phase inversion emulsification or acid precipitation is one encapsulated by allowing a carboxyl group-containing random polymer produced by solution polymerization to be adsorbed by surfaces of pigment particles by various methods, and this has been used as the colorant of the inkjet recording pigment ink. However, the former dispersant or the latter carboxyl group-containing random polymer produced by solution polymerization is merely adsorbed on the surfaces of the pigment particles, so that the dispersant or the polymer tends to be easily eliminated from the surfaces of the pigment particles by some kind of environmental factor. In contrast, in the encapsulated colorant according to the embodiment of the invention, the surfaces of the colorant particles are completely encapsulated with encapsulation walls comprising the polymer or the crosslinked polymer without any defects, and moreover, the polymer or the crosslinked polymer is extremely firmly fixed to the surfaces of the particles, as described above. It is therefore considered that the polymer or the crosslinked polymer becomes difficult to be eliminated from the surfaces of the colorant particles. More particularly, an ink produced from a pigment dispersion in which a pigment is dispersed with the dispersant such as the surfactant or the polymer dispersant, the above-mentioned acetylene glycol-based surfactant and/or acetylene alcohol-based surfactant, and the penetrant such as diethylene glycol monobutyl ether, triethylene glycol monobutyl ether, propylene glycol monobutyl ether, dipropylene glycol monobutyl ether or a 1,2-alkyldiol tends to become unstable in ejection. This is because the dispersant adsorbed tends to be easily eliminated from the surfaces of the pigment particles by strong shear force applied when the ink is ejected through fine nozzles of a head of a inkjet printer, which causes dispersibility of the pigment particles in the ink to deteriorate. In contrast, in the inkjet recording ink using the encapsulated colorant according to the embodiment of the invention, such a phenomenon is not observed at all, and the ink is stably ejected. Further, in the ink composition using the pigment dispersion in which the pigment is dispersed with the dispersant such as the surfactant or the polymer dispersant, and improved in penetrability, the viscosity of the ink composition easily increases due to the dispersant dissolved in the solution without being adsorbed on the surfaces of the pigment particles, and the viscosity also tends to increase due to the dispersant eliminated from the surfaces of the pigment particles with an elapse of time, so that the content of the pigment is limited in many cases. This becomes a factor that causes failure to obtain sufficient print density, particularly on plain paper or recycled paper. In contrast, in the ink composition using the encapsulated colorant according to the embodiment of the invention, no increase in the viscosity of the ink composition occurs at all, for the same reason as described above. Accordingly, the ink composition is easily lowered in viscosity to make it possible to contain more colorant particles. Thus, sufficient print density can be obtained even on plain paper or recycled paper.

Further, in the inkjet recording ink according to an embodiment of the invention, in order to make it difficult to generate clogging (improvement in clogging reliability), a solid wetting agent is preferably added in an amount of 3 to 20% by weight based on the total weight of the ink. In this specification, the solid wetting agent means a water-soluble substance which is solid at ordinary temperature (25° C.) and has a water-retaining function. Preferred examples of the solid wetting agents include a saccharide, a sugar alcohol, a hyaluronate, trimethylolpropane and 1,2,6-hexanetriol. Examples of the saccharides include a monosaccharide, a disaccharide, an oligosaccharide (including a trisaccharide and a tetrasaccharide) and a polysaccharide. Preferred examples thereof include glucose, mannose, fructose, ribose, xylose, arabinose, galactose, aldonic acid, glucitol (sorbit), maltose, cellobiose, lactose, sucrose, trehalose and maltotriose. The polysaccharide as used herein means a saccharide in its broad sense, and is used in the sense that it includes substances widely occurring in nature such as alginic acid, α-cyclodextrin and cellulose. Further, derivatives of these saccharides include a reduced sugar of the above-mentioned saccharide (for example, a sugar alcohol (represented by the general formula $HOCH_2(CHOH)_nCH_2OH$ (wherein n represents an integer of 2 to 5)), an oxidized sugar (for example, an aldonic acid or a uronic acid), an amino acid and a thiosugar. In particular, a sugar alcohol is preferred, and specific examples thereof include maltitol, sorbitol and xylitol. As the hyaluronate, there can be used a product commercially available as a 1% aqueous solution of sodium hyaluronate (molecular weight: 350,000). These solid wetting agents are used either alone or as a mixture of two or more thereof. Particularly preferred examples of the solid wetting agents are trimethylolpropane and 1,2,6-hexanetriol. The use of the solid wetting agent can restrain the evaporation of water by its water retaining function, so that the ink does not increase in viscosity in flow paths thereof or in the vicinities of nozzles, and a film generated by drying of the ink becomes difficult to be formed, resulting in the difficulty of the occurrence of clogging. Further, the above-mentioned solid wetting agent is chemically stable, so that it does not decompose in the ink, thereby being able to maintain the performance for a long period of time. Furthermore, even when the above-mentioned solid wetting agent is added to the ink, the ink does not wet a nozzle plate, thereby being able to obtain stable ejection. In particular, when trimethylolpropane and 1,2,6-hexanetriol are used, excellent results are obtained. In the invention, when the above-mentioned solid wetting agents are used alone, the content thereof is preferably from 3 to 20% by weight, and more preferably from 3 to 10% by weight, based on the total weight of the inkjet recording ink composition. When two or more thereof are used as a mixture, the total amount of two or more thereof is preferably from 3 to 20% by weight, and more preferably from 3 to 10% by weight, based on the total weight of the inkjet recording ink. When two or more thereof are used as a mixture, preferred is a combination of one selected from the group consisting of a saccharide, a sugar alcohol and a hyaluronate and one selected from the group consisting of trimethylolpropane and 1,2,6-hexanetriol. This combination is preferred because an increase in the viscosity of the ink caused by addition can be restrained. When the content of the solid wetting agents is less than 3% by weight, the sufficient effect of improving clogging reliability is not obtained. On the other hand, exceeding 20% by weight results in the tendency of the harmful effect to occur that the viscosity increases to become hard to obtain stable ejection.

The inkjet recording inks according to the embodiments of the invention have been described above. The encapsulated colorant according to each embodiment of the invention contained as a colorant is shaped like a true sphere. The shape comes closer to a true sphere, as the thickness of the polymer layer with which the core material is coated increases, or as the number of the polymer layers increases. Further, the ionic groups on its surface are regularly and densely orientated toward the aqueous medium side to have effective electrostatic repulsion. Flowability of the ink easily becomes Newtonian thereby. Accordingly, the inkjet recording ink according to the embodiment of the invention is markedly excellent in dispersibility and dispersion stability, compared to the conventional encapsulated pigments, and more stable ejection properties can be obtained.

The inkjet recording can be suitably achieved by mounting the inkjet recording ink according to the embodiment of the invention on a known inkjet printer, and printing the ink on the recording medium such as plain paper or the recording medium for inkjet recording. The resulting images are excellent in fastness, abrasion resistance and color developability, and also high in print density. Blurring is scarcely observed. Further, when plain paper is used as the recording medium, the recorded matter which is hard to blur and high in color development is obtained. Furthermore, when the exclusive medium for inkjet recording (for example, a glossy medium) is used, there can be obtained glossy images having no irregular reflection such as bronzing and excellent in image clarity and sharpness. In addition, fixability also becomes excellent.

EXAMPLES

The present invention will be illustrated in greater detail with reference to the following Examples, but the invention should not be construed as being limited thereto.

Production of Multilayer Encapsulated Inorganic Colloidal Particles "DN1"

To 100 g of colloidal silica (trade name: Snowtex-O) manufactured by Nissan Chemical Industries, Ltd., 300 g of ion exchanged water was added, followed by mixing with stirring, and then, 12.5 g of methacrylic acid dimethylaminoethyl chloride was added as a cationic hydrophilic monomer, followed by mixing. Thereafter, the resulting mixture was irradiated with an ultrasonic wave for 15 minutes. Then, 10 g of 2-ethylhexyl methacrylate was added, followed by mixing with stirring, and 47.0 g of an anionic polymerizable surfactant, Aqualon KH-10 (manufactured by Daiichi Kogyo Yakuhin Co., Ltd.), previously dissolved in 50 g of ion exchanged water and 1.0 g of 2-acrylamido-2-methylpropanesulfonic acid as a hydrophilic monomer were added, followed by mixing. The resulting mixture was irradiated with an ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 1.6 g of potassium persulfate was dissolved as a polymerization initiator in 50 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and ultrafiltration was performed by a cross flow method with an ultrafiltration system to adjust the solid concentration to 20%. After the filtration, the pH was adjusted to 8 with a 1-mol/l aqueous solution of potassium hydroxide again to obtain a dispersion of monolayer encapsulated inorganic colloidal particles. Then, 85 g of the resulting dispersion was diluted with 150 g of ion exchanged water, and 12.6 g of methacrylic acid dimethylaminoethyl chloride was added thereto as a cationic hydrophilic monomer, followed by mixing. Thereafter, the resulting mixture was irradiated with an ultrasonic wave for 15 minutes. Then, 10 g of benzyl methacrylate and 0.2 g of 1,6-hexanediol dimethacrylate were mixed and added, followed by mixing with stirring, and 47.0 g of an anionic polymerizable surfactant, Aqualon KH-10, previously dissolved in 50 g of ion exchanged water and 1.0 g of 2-acrylamido-2-methylpropanesulfonic acid as an anionic hydrophilic monomer were added. The resulting mixture was irradiated with an ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 1.6 g of potassium persulfate was dissolved as a polymerization initiator in 50 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and ultrafiltration was performed by a cross flow method with an ultrafiltration system to adjust the solid concentration to 20%. After the filtration, the pH was adjusted to 8 with a 1-mol/l aqueous solution of potassium hydroxide again, and coarse particles were removed through a membrane filter having a pore size of 1 μm to obtain a dispersion of target multiplayer encapsulated inorganic colloidal particles "DN1". The volume average particle size of the resulting dispersion was measured with a laser doppler system size distribution analyzer, Microtrac UPA150, manufactured by Leads & Northlop Co. As a result, it was 34 nm.

Production of Multilayer Encapsulated Inorganic Colloidal Particles "DN2"

To 100 g of colloidal silica (trade name: Snowtex-C) manufactured by Nissan Chemical Industries, Ltd., 300 g of ion exchanged water was added, followed by mixing with stirring, and then, 12.5 g of methacrylic acid dimethylaminoethyl chloride was added as a cationic hydrophilic monomer, followed by mixing. Thereafter, the resulting mixture was irradiated with an ultrasonic wave for 15 minutes. Then, 10 g of benzyl methacrylate was added, followed by mixing with stirring, and 47.0 g of an anionic polymerizable surfactant, Aqualon KH-10 (manufactured by Daiichi Kogyo Yakuhin Co., Ltd.), previously dissolved in 50 g of ion exchanged water and 1.0 g of 2-acrylamido-2-methylpropanesulfonic acid as a hydrophilic monomer were added, followed by mixing. The resulting mixture was irradiated with an ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 1.6 g of potassium persulfate was dissolved as a polymerization initiator in 50 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and ultrafiltration was performed by a cross flow method with an ultrafiltration system to adjust the solid concentration to 20%. After the filtration, the pH was adjusted to 8 with a 1-mol/l aqueous solution of potassium hydroxide again to obtain a dispersion of monolayer encapsulated inorganic colloidal particles. Then, 85 g of the resulting dispersion was diluted with 150 g of ion exchanged water, and 12.6 g of methacrylic acid dimethylaminoethyl chloride was added thereto as a cationic hydrophilic monomer, followed by mixing. Thereafter, the resulting mixture was irradiated with an ultrasonic wave for 15 minutes. Then, 10 g of isobonyl methacrylate was added, followed by mixing with stirring, and 47.0 g of an anionic polymerizable surfactant, Aqualon KH-10, previously dissolved in 50 g of ion exchanged water and 1.0 g of 2-acrylamido-2-methylpropanesulfonic acid as an anionic hydrophilic monomer were added. The resulting mixture was irradiated with an ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 1.6 g of potassium persulfate was dissolved as a polymerization initiator in 50 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and ultrafiltration was performed by a cross flow method with an ultrafiltration system to adjust the solid concentration to 20%. After the filtration, the pH was adjusted to 8 with a 1-mol/l aqueous solution of potassium hydroxide again, and coarse particles were removed through a membrane filter having a pore size of 1 μm to obtain a dispersion of target multiplayer encapsulated inorganic colloidal particles "DN2". The volume average particle size of the resulting dispersion was measured with a laser doppler system size distribution analyzer, Microtrac UPA150, manufactured by Leads & Northlop Co. As a result, it was 35 nm. The glass transition points of the respective polymers constituting the respective coating layers of the first and second layers were determined by the Fox equation from the kind of the monomer component constituting the polymer and the ratio thereof. As a result, they were 54° C. and 155° C., respectively.

The invention will be more specifically described below with reference to examples and reference examples of multiplayer encapsulated pigment dispersions used in the inkjet recording inks, but the invention should not be construed as being limited to these examples.

Production of Magenta Pigment Particles "P1" Having Anionic Groups on Their Surfaces With 500 g of quinoline, 20 g of an isoindolinone pigment (C.I. Pigment Red 122) was mixed, and dispersed in an Eiger Motor Mill, M250 (manufactured by Eiger Japan Co., Ltd.) under the conditions of a bead loading of 70% and 5,000 revolutions for 2 hours. This was transferred to an evaporator, and heated at 120° C. while reducing the pressure to 30 mmHg or lower, thereby removing water contained in the system by distillation as much as possible. Thereafter, the temperature was controlled to 160° C. Then, 20 g of a sulfonated pyridine complex was added, and allowed to react for 8 hours. After the termination of the reaction, the reaction product was washed several times with excess quinoline, poured into water, and filtered, thereby obtaining magenta pigment particles "P1" having hydrophilic groups (anionic groups) on their surfaces. The amount of the anionic groups introduced into the resulting magenta pigment particles "P1" was 0.06 mmol/g. Further, the volume average particle size of an aqueous dispersion in which 100 g of the resulting magenta pigment particles "P1" were dispersed in 500 g of ion exchanged water was measured with a laser doppler system size distribution analyzer, Microtrac UPA150, manufactured by Leads & Northlop Co. As a result, it was 80 nm.

Production of Monolayer Encapsulated Pigment Dispersions "M1" to "M5"

Production of Monolayer Encapsulated Pigment Dispersion "M1"

To an aqueous dispersion in which 100 g of magenta pigment particles "P1" having anionic groups on their surfaces were dispersed in 500 g of ion exchanged water, 1.25 g of methacrylic acid dimethylaminoethyl chloride was added as a cationic hydrophilic monomer, followed by mixing. Thereafter, the resulting mixture was irradiated with an ultrasonic wave for 15 minutes. Then, 7 g of lauryl methacrylate, 7 g of benzyl methacrylate and 6 g of isobonyl methacrylate were mixed and added, followed by mixing with stirring, and 3.9 g of an anionic polymerizable surfactant, Aqualon KH-10, previously dissolved in 50 g of ion exchanged water and 0.207 g of 2-acrylamido-2-methylpropanesulfonic acid as an anionic hydrophilic monomer were added. The resulting mixture was irradiated with an ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 0.6 g of potassium persulfate was dissolved as a polymerization initiator in 20 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 μm. Then, this was subjected to ultrafiltration by a cross flow method with an ultrafiltration system to carry out condensation, thereby adjusting the solid concentration to 15% by weight. Thus, a target monolayer encapsulated pigment dispersion "M1" was obtained. The volume average particle size of the resulting dispersion was measured with a laser doppler system size distribution analyzer, Microtrac UPA150, manufactured by Leads & Northlop Co. As a result, it was 88 nm. Further, the glass transition point was determined by the Fox equation from the kind of the monomer component constituting the polymer and the ratio thereof. As a result, it was 17° C.

Production of Monolayer Encapsulated Pigment Dispersion "M2"

To an aqueous dispersion in which 100 g of magenta pigment particles "P1" having anionic groups on their surfaces were dispersed in 500 g of ion exchanged water, 3.0 g of methacrylic acid dimethylaminoethyldodecyl chloride was added as a cationic hydrophilic monomer, followed by mixing. Thereafter, the resulting mixture was irradiated with an ultrasonic wave for 15 minutes. Then, 20 g of lauryl methacrylate, 35 g of benzyl methacrylate and 45 g of isobonyl methacrylate were mixed and added, followed by mixing with stirring, and 4.68 g of an anionic polymerizable surfactant, Aqualon KH-10, previously dissolved in 50 g of ion exchanged water was added, followed by mixing with stirring. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 0.6 g of potassium persulfate was dissolved as a polymerization initiator in 20 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 μm. Then, this was subjected to ultrafiltration by a cross flow method with an ultrafiltration system to carry out condensation, thereby adjusting the solid concentration to 20% by weight. After the filtration, the pH was adjusted to 8 with a 1-mol/l aqueous solution of potassium hydroxide again to obtain a target monolayer encapsulated pigment dispersion "M2". The volume average particle size of the resulting dispersion was measured with a laser doppler system size distribution analyzer, Microtrac UPA150, manufactured by Leads & Northlop Co. As a result, it was 108 nm. Further, the glass transition point was determined by the Fox equation from the kind of the monomer component constituting the polymer and the ratio thereof. As a result, it was 51° C.

Production of Monolayer Encapsulated Pigment Dispersion "M3"

To an aqueous dispersion in which 10 g of magenta pigment particles "P1" having anionic groups on their surfaces were dispersed in 50 g of ion exchanged water, 0.125 g of methacrylic acid dimethylaminoethyl chloride was added as a cationic hydrophilic monomer, followed by mixing. Thereafter, the resulting mixture was irradiated with an ultrasonic wave for 15 minutes. Then, 5.5 g of butyl methacrylate, 4.0 g of benzyl methacrylate and 0.5 g of isobonyl methacrylate were mixed and added, followed by mixing with stirring, and 1.0 g of an anionic polymerizable surfactant, Adeka Reasoap SR-10 manufactured by Asahi Denka Co., Ltd., previously dissolved in 10 g of ion exchanged water was added. Then, 310 g of ion exchanged water was added thereto, followed by mixing. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 0.22 g of potassium persulfate was dissolved as a polymerization initiator in 50 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 μm. Then, this was subjected to ultrafiltration by a cross flow method with an ultrafiltration system to carry out condensation, thereby adjusting the solid concentration to 15% by weight. Thus, a target monolayer encapsulated pigment dispersion "M3" was obtained. The volume average particle size of the resulting dispersion was measured with a laser doppler system size distribution analyzer, Microtrac UPA150, manufactured by Leads & Northlop Co. As a result, it was 105 nm. Further, the glass transition point was determined by the Fox equation from the kind of the monomer component constituting the polymer and the ratio thereof. As a result, it was 35° C.

Production of Monolayer Encapsulated Pigment Dispersion "M4"

To an aqueous dispersion in which 100 g of magenta pigment particles "P1" having anionic groups on their surfaces were dispersed in 500 g of ion exchanged water, 3.0 g of methacrylic acid dimethylaminoethyldodecyl chloride was added as a cationic hydrophilic monomer, followed by mixing. Thereafter, the resulting mixture was irradiated with an ultrasonic wave for 15 minutes. Then, 20 g of lauryl methacrylate, 35 g of benzyl methacrylate, 45 g of isobonyl methacrylate and 0.2 g of 1,6-hexanediol dimethacrylate were mixed and added, followed by mixing with stirring, and 4.68 g of an anionic polymerizable surfactant, Aqualon KH-10, previously dissolved in 50 g of ion exchanged water was added, followed by mixing with stirring. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 2.1 g of potassium persulfate was dissolved as a polymerization initiator in 20 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 μm. Then, this was subjected to ultrafiltration by a cross flow method with an ultrafiltration system to carry out condensation, thereby adjusting the solid concentration to 20% by weight. After the filtration, the pH was adjusted to 8 with a 1-mol/l aqueous solution of potassium hydroxide again to obtain a target monolayer encapsulated pigment dispersion "M4". The volume average particle size of the resulting dispersion was measured with a laser doppler system size distribution analyzer, Microtrac UPA150, manufactured by Leads & Northlop Co. As a result, it was 108 nm.

Production of Multilayer Encapsulated Pigment Dispersions "D1" to "D5"

Production of Multilayer Encapsulated Pigment Dispersion "D1"

To an aqueous dispersion in which 270 g of the above-mentioned monolayer encapsulated pigment dispersion "M1" was diluted with 330 g of ion exchanged water, 1.25 g of methacrylic acid dimethylaminoethyl chloride was added as a cationic hydrophilic monomer, followed by mixing. Thereafter, the resulting mixture was irradiated with an ultrasonic wave for 15 minutes. Then, 20 g of 2-ethylhexyl methacrylate was added, followed by mixing with stirring, and 1.35 g of an anionic polymerizable surfactant, Aqualon KH-10, previously dissolved in 50 g of ion exchanged water and 0.04 g of 2-acrylamido-2-methylpropanesulfonic acid as an anionic hydrophilic monomer were added. The resulting mixture was irradiated with an ultrasonic wave again for 30 minutes. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 0.45 g of potassium persulfate was dissolved as a polymerization initiator in 20 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 μm. Then, this was subjected to ultrafiltration by a cross flow method with an ultrafiltration system to adjust the solid concentration to 20%. After the filtration, the pH was adjusted to 8 with a 1-mol/l aqueous solution of potassium hydroxide again to obtain a target multilayer encapsulated pigment dispersion "D1". The volume average particle size of the resulting dispersion was measured with a laser doppler system size distribution analyzer, Microtrac UPA150, manufactured by Leads & Northlop Co. As a result, it was 123 nm. Further, the glass transition point of the polymer of the upper layer was determined by the Fox equation from the kind of the monomer component constituting the polymer and the ratio thereof. As a result, it was −10° C.

Production of Multilayer Encapsulated Pigment Dispersion "D2"

To an aqueous dispersion in which 270 g of the above-mentioned monolayer encapsulated pigment dispersion "M2" was diluted with 330 g of ion exchanged water, 0.78 g of methacrylic acid dimethylaminoethyldodecyl chloride was added as a cationic polymerizable surfactant, followed by mixing. Thereafter, the resulting mixture was irradiated with an ultrasonic wave for 15 minutes. Then, 15 g of lauryl methacrylate and 35 g of benzyl methacrylate were mixed and added, followed by mixing with stirring, and 1.21 g of an anionic polymerizable surfactant, Aqualon KH-10, previously dissolved in 50 g of ion exchanged water was added, followed by mixing with stirring. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 0.45 g of potassium persulfate was dissolved as a polymerization initiator in 60 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 μm. Then, this was subjected to ultrafiltration by a cross flow method with an ultrafiltration system to adjust the solid concentration to 15%. After the filtration, the pH was adjusted to 8 with a 1-mol/l aqueous solution of potassium hydroxide again to obtain a target multilayer encapsulated pigment dispersion "D2". The volume average particle size of the resulting dispersion was measured with a laser doppler system size distribution analyzer, Microtrac UPA150, manufactured by Leads & Northlop Co. As a result, it was 129 nm. Further, the glass transition point of the polymer of the upper layer was determined by the Fox equation from the kind of the monomer component constituting the polymer and the ratio thereof. As a result, it was 6° C.

Production of Multilayer Encapsulated Pigment Dispersion "D3"

To an aqueous dispersion in which 270 g of the above-mentioned monolayer encapsulated pigment dispersion "M3" was diluted with 330 g of ion exchanged water, 0.78 g of methacrylic acid dimethylaminoethyldodecyl chloride was added as a cationic polymerizable surfactant, followed by mixing. Thereafter, the resulting mixture was irradiated with an ultrasonic wave for 15 minutes. Then, 15 g of lauryl methacrylate and 35 g of benzyl methacrylate were mixed and added, followed by mixing with stirring, and 1.21 g of an anionic polymerizable surfactant, Aqualon KH-10, previously dissolved in 50 g of ion exchanged water was added, followed by mixing with stirring. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 0.6 g of potassium persulfate was dissolved as a polymerization initiator in 60 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 µm. Then, this was subjected to ultrafiltration by a cross flow method with an ultrafiltration system to adjust the solid concentration to 20%. After the filtration, the pH was adjusted to 8 with a 1-mol/l aqueous solution of potassium hydroxide again to obtain a target multilayer encapsulated pigment dispersion "D3". The volume average particle size of the resulting dispersion was measured with a laser doppler system size distribution analyzer, Microtrac UPA150, manufactured by Leads & Northlop Co. As a result, it was 120 nm. Further, the glass transition point of the polymer of the upper layer was determined by the Fox equation from the kind of the monomer component constituting the polymer and the ratio thereof. As a result, it was 6° C.

Production of Multilayer Encapsulated Pigment Dispersion "D4"

To an aqueous dispersion in which 270 g of the above-mentioned monolayer encapsulated pigment dispersion "M4" was diluted with 330 g of ion exchanged water, 0.79 g of methacrylic acid dimethylaminoethyldodecyl chloride was added as a cationic polymerizable surfactant, followed by mixing. Thereafter, the resulting mixture was irradiated with an ultrasonic wave for 15 minutes. Then, 15 g of lauryl methacrylate and 35 g of benzyl methacrylate were mixed and added, followed by mixing with stirring, and 1.23 g of an anionic polymerizable surfactant, Aqualon KH-10, previously dissolved in 50 g of ion exchanged water was added, followed by mixing with stirring. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 1.0 g of potassium persulfate was dissolved as a polymerization initiator in 60 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 µm. Then, this was subjected to ultrafiltration by a cross flow method with an ultrafiltration system to adjust the solid concentration to 15%. After the filtration, the pH was adjusted to 8 with a 1-mol/l aqueous solution of potassium hydroxide again to obtain a target multilayer encapsulated pigment dispersion "D4". The volume average particle size of the resulting dispersion was measured with a laser doppler system size distribution analyzer, Microtrac UPA150, manufactured by Leads & Northlop Co. As a result, it was 127 nm.

Production of Multilayer Encapsulated Pigment Dispersion "D5"

To an aqueous dispersion in which 270 g of the above-mentioned monolayer encapsulated pigment dispersion "M4" was diluted with 330 g of ion exchanged water, 0.79 g of methacrylic acid dimethylaminoethyldodecyl chloride was added as a cationic polymerizable surfactant, followed by mixing. Thereafter, the resulting mixture was irradiated with an ultrasonic wave for 15 minutes. Then, 27.5 g of butyl methacrylate, 20 g of benzyl methacrylate and 2.5 g of isobonyl methacrylate were mixed and added, followed by mixing with stirring, and 1.23 g of an anionic polymerizable surfactant, Aqualon KH-10, previously dissolved in 50 g of ion exchanged water was added, followed by mixing with stirring. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 1.0 g of potassium persulfate was dissolved as a polymerization initiator in 60 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 µm. Then, this was subjected to ultrafiltration by a cross flow method with an ultrafiltration system to adjust the solid concentration to 15%. After the filtration, the pH was adjusted to 8 with a 1-mol/l aqueous solution of potassium hydroxide again to obtain a multilayer encapsulated pigment dispersion. The volume average particle size of the resulting dispersion was measured with a laser doppler system size distribution analyzer, Microtrac UPA150, manufactured by Leads & Northlop Co. As a result, it was 127 nm. Further, the glass transition point was determined by the Fox equation from the kind of the monomer component constituting the polymer and the ratio thereof. As a result, it was 35° C. To an aqueous dispersion in which 270 g of this multilayer encapsulated pigment dispersion was diluted with 330 g of ion exchanged water, 0.79 g of methacrylic acid dimethylaminoethyldodecyl chloride was added as a cationic polymerizable surfactant, followed by mixing. Thereafter, the resulting mixture was irradiated with an ultrasonic wave for 15 minutes. Then, 15 g of lauryl methacrylate and 35 g of benzyl methacrylate were mixed and added, followed by mixing with stirring, and 1.23 g of an anionic polymerizable surfactant, Aqualon KH-10, previously dissolved in 50 g of ion exchanged water was added, followed by mixing with stirring. This was put into a reaction vessel equipped with a stirrer, a reflux condenser, a dropping funnel, a temperature controller, a nitrogen-introducing pipe and an ultrasonic generator. After the internal temperature of the reaction vessel was elevated to 80° C., an aqueous solution of potassium persulfate in which 1.0 g of potassium persulfate was dissolved as a polymerization initiator in 60 g of ion exchanged water was added dropwise, and polymerization was conducted at 80° C. for 6 hours, while introducing nitrogen. After the termination of the polymerization, the pH was adjusted to 8 with a 1-mol/l aqueous solution of potassium hydroxide, and coarse particles were removed by filtration through a membrane filter having a pore size of 1 µm. Then, this was subjected to ultrafiltration by a cross flow method with an ultrafiltration system to adjust the solid concentration to 15%. After the filtration, the pH was adjusted to 8 with a 1-mol/l aqueous solution of potassium hydroxide again to obtain a target multilayer encapsulated pigment dispersion "D5". The volume average particle size of the resulting dispersion was measured with a laser doppler system size distribution analyzer, Microtrac UPA150, manufactured by Leads & Northlop Co. As a result, it was 150 nm. Further, the glass transition point of the polymer of the upper layer was determined by the Fox equation from the kind of the monomer component constituting the polymer and the ratio thereof. As a result, it was 6° C.

Production of Encapsulated Pigment Dispersion "M5"

A flask was charged with 250 g of methyl ethyl ketone, the temperature of which was elevated to 75° C. with stirring under a nitrogen seal. A mixed solution of 170 g of n-butyl methacrylate, 58 g of n-butyl acrylate, 35 g of 2-hydroxyethyl methacrylate, 35 g of methacrylic acid and 20 g of a polymerization initiator, Perbutyl O, was added dropwise thereto taking 2 hours, followed by further reaction for 15 hours to obtain a solution of a vinyl polymer. Into a stainless steel beaker, 15 g of the above-mentioned polymer solution was put together with 0.8 g of dimethylethanolamine and 15 g of a magenta pigment (C.I. Pigment Red 122), and ion exchanged water was further added to bring the total amount to 75 g. Then, 250 g of zirconia beads having an average particle size of 0.5 mm was added thereto, followed by kneading with a sand mill for 4 hours. After the termination of the kneading, the zirconia beads were removed by filtration to obtain an aqueous dispersion in which a dispersion comprising the polymer having the carboxyl group neutralized with the base and the pigment was dispersed in water. A 1 N hydrochloric acid was added to the resulting dispersion with stirring at ordinary temperature until the resin was insolubilized to be firmly fixed to the pigment. At this time, the pH was 3 to 5. The aqueous medium containing the pigment to which the polymer was firmly fixed was filtered by suction and washed with water to obtain a wet cake. A 10% aqueous solution of NaOH was added thereto, while stirring the wet cake with a dispersing device, until the pH of the dispersion reached 8.5 to 9.5, and stirring was continued for 1 hour. Then, ion exchanged water was added to adjust the solid concentration to 20%, thereby obtaining microencapsulated pigment dispersion "M5" of C.I. Pigment Red 122.

Examples 1 to 5, Reference Examples 1 to 3 and Comparative Examples 1 and 2

Preparation of Inkjet Recording Ink

Inkjet recording inks of Examples 1 to 5, Reference Examples 1 to 3 and Comparative Examples 1 and 2 were prepared based on compositions shown in Table 1 described below.

TABLE 1

|  |  | Example 1 | Example 2 | Example 3 | Example 4 | Example 5 | Comparative Example 1 | Comparative Example 2 | Comparative Example 3 | Reference Example 1 | Reference Example 2 |
|---|---|---|---|---|---|---|---|---|---|---|---|
| Encapsulated Pigment Dispersion of the Invention | D1 | 11.2 | | | | | | | | | |
|  | D2 | | 11.2 | | | | | | | | |
|  | D3 | | | 11.2 | | | | | | | |
|  | D4 | | | | 11.2 | | | | | | |
|  | D5 | | | | | 11.2 | | | | | |
| Pigment Dispersion for Comparison and Reference | M2 | | | | | | 8 | | | | |
|  | M3 | | | | | | | 8 | | | |
|  | M4 | | | | | | | | 8 | | |
|  | M5 | | | | | | | | | 8 | |
|  | P1 | | | | | | | | | | 8 |
| Wetting Agent | Glycerol | 13 | 13 | 13 | 13 | 13 | 13 | 13 | 13 | 10 | 15 |
|  | Diethylene Glycol | | | | | | | | | 5 | |
| Penetrant | Diethylene Glycol Monobutyl Ether | 5 | 5 | 5 | 5 | 5 | 5 | 5 | 5 | 6 | |
|  | 1,2-Hexanediol | 5 | 5 | 5 | 5 | 5 | 5 | 5 | 5 | | 7.5 |
| Solid Wetting Agent | Trimethylolpropane | 8 | 8 | 8 | 8 | 8 | 8 | 8 | 8 | | |
| Polar Solvent | 2-Pyrrolidone | 2 | 2 | 2 | 2 | 2 | 2 | 2 | 2 | | |
| Surfactant | Olfine E1010 | 1 | 1 | 1 | 1 | 1 | 1 | 1 | 1 | | |
|  | Surfynol 465 | | | | | | | | | 1 | 1 |
| pH Adjuster | Potassium Hydroxide | 0.1 | 0.1 | 0.1 | 0.1 | 0.1 | 0.1 | 0.1 | 0.1 | | |
|  | Propanolamine | | | | | | | | | 3 | 1 |
| Water | Ion Exchanged Water | remainder | remainder | remainder | remainder | remainder | remainder | remainder | remainder | remainder | remainder |

The amounts added are all indicated by wt %.
The encapsulated pigments are indicated by solid weight.

Evaluation

The ink jet recording inks of Examples 1 to 5, Reference Examples 1 to 3 and Comparative Examples 1 and 2, and recorded matter printed using these inks were evaluated by methods shown below. The results thereof are shown in Table 2.

Evaluation 1: Abrasion Resistance

An ink cartridge was filled with each of the ink jet recording inks of Examples, Reference Examples and Comparative Examples, and mounted on an ink jet printer, PM-720C (manufactured by Seiko Epson Corporation). A solid print was made in a region of 10 mm×10 mm on a super fine glossy film designed for ink jet printing (manufactured by Seiko Epson Corporation) at a duty of 100%. After standing at a temperature of 25° C. for 1 hour, the above-mentioned printed region was rubbed with a yellow highlight pen using an aqueous ink (ZEBRA PEN 2 (trade name) manufactured by Zebra Pen Corporation) at a load of 500 g and at a speed of 10 mm/sec, and it was observed whether a stain occurred or not. The results thereof were evaluated according to the following criteria:

A: No stain occurs at all even when the printed region was rubbed twice.

B: No stain occurs when the printed region was rubbed once, but a stain occurs when it was rubbed twice.

C: A stain occurs when the printed region was rubbed once.

Evaluation 2: Scratch Resistance

An ink cartridge was filled with each of the ink jet recording inks of Examples, Reference Examples and Comparative Examples, and mounted on an ink jet printer, PM-720C (manufactured by Seiko Epson Corporation). A solid print was made in a region of 10 mm×10 mm on a super fine glossy film designed for ink jet printing (manufactured by Seiko Epson Corporation) at a duty of 100%. After standing at a temperature of 25° C. for 1 hour, a region in the vicinity of a boundary between the above-mentioned printed region and a non-printed region was scratched with an HB pencil, and the degree of separation of the pigment particles was observed. The results thereof were evaluated according to the following criteria:

AA: No separation occurs even when the region was scratched four times.

A: No separation occurs even when the region was scratched twice.

B: No separation occurs when the region was scratched once, but a stain occurs when it was scratched twice.

C: Separation occurs when the region was scratched once.

Evaluation 3: Fixability

An ink cartridge was filled with each of the ink jet recording inks of Examples, Reference Examples and Comparative Examples, and mounted on an ink jet printer, PM-720C (manufactured by Seiko Epson Corporation). A solid print was made in a region of 10 mm×10 mm on a super fine glossy film designed for ink jet printing (manufactured by Seiko Epson Corporation) at a duty of 100%. After standing at a temperature of 25° C. for 1 hour, a Scotch mending tape of the 18 mm type (Sumitomo 3M Ltd.) was lightly attached onto the above-mentioned printed region, and a cylindrical metallic roller with a diameter of 20 mm, a length of 810 mm and a weight of 200 g was placed thereon. Then, this roller was rolled to reciprocate it once on a portion onto which the tape was attached.

Then, the tape attached was peeled, and the degree of separation of the pigment particles was visually observed. The results thereof were evaluated according to the following criteria:

A: No separation occurs at all.

B: Separation occurs in a region of less than 10% based on the whole area of the region onto which the tape has been attached.

C: Separation occurs in a region of 10% or more based on the whole area of the region onto which the tape has been attached.

Evaluation 4: Glossiness

An ink cartridge was filled with each of the ink jet recording inks of Examples, Reference Examples and Comparative Examples, and mounted on an ink jet printer, PM-720C (manufactured by Seiko Epson Corporation). A solid print was made in a region of 10 mm×10 mm on super fine glossy paper designed for ink jet printing and PM Photographic Paper (glossy) manufactured by Seiko Epson Corporation at a duty of 100%, followed by standing at a temperature of 25° C. for 1 hour. Then, the presence or absence of glossiness was visually observed, and evaluated according to the following criteria:

A: Extremely glossy (highly glossy).

B: Glossy but inferior to A.

C: Slightly glossy.

D: Not glossy at all.

Evaluation 5: Ejection Stability

An ink cartridge was filled with each of the ink jet recording inks of Examples, Reference Examples and Comparative Examples, and mounted on an ink jet printer, PM-720C (manufactured by Seiko Epson Corporation). Then, 1-mm ruled lines were printed on super fine glossy paper designed for ink jet printing (manufactured by Seiko Epson Corporation). The state of printing such as dot missing and deviation in an ink landing position was visually observed, and evaluated according to the following criteria:

A: Even when 20,000 or more prints are carried out, neither dot missing nor deviation in the ink landing position occurs.

B: When 10,000 to less than 20,000 prints are carried out, dot missing or deviation in the ink landing position occurs.

C: When 1,000 to less than 10,000 prints are carried out, dot missing or deviation in the ink landing position occurs.

D: When 100 to less than 1,000 prints are carried out, dot missing or deviation in the ink landing position occurs.

E: When less than 100 prints are carried out, dot missing or deviation in the ink landing position occurs.

Evaluation 6: Clogging Reliability

After the printing conducted in the above-mentioned evaluation 4, a power supply of the printer was turned off, and the ink was allowed to stand. After two weeks, the same printing test was conducted. The "state of ink ejection" at that time was visually observed, and evaluated according to the following criteria:

A: Normal printing starts without a cleaning operation at the same time that print signals are transmitted to the printer.

B: Normal printing is attained after three or less cleaning operations.

C: Normal printing is attained after six or less cleaning operations.

D: Normal printing can not be attained even when a cleaning operation is repeated seven or more times.

TABLE 2

| | Evaluation 1 Abrasion Resistance | Evaluation 2 Scratch Resistance | Evaluation 3 Fixability | Evaluation 4 Glossiness | Evaluation 5 Ejection Stability | Evaluation 6 Clogging Reliability |
|---|---|---|---|---|---|---|
| Example 1 | A | A | A | B | B | B |
| Example 2 | A | AA | A | A | A | A |
| Example 3 | A | AA | A | A | A | A |
| Example 4 | A | AA | A | B | A | A |

TABLE 2-continued

|  | Evaluation | | | | | |
|---|---|---|---|---|---|---|
|  | Evaluation 1 Abrasion Resistance | Evaluation 2 Scratch Resistance | Evaluation 3 Fixability | Evaluation 4 Glossiness | Evaluation 5 Ejection Stability | Evaluation 6 Clogging Reliability |
| Example 5 | A | AA | A | A | A | A |
| Comparative Example 1 | A | A | A | A | A | A |
| Comparative Example 2 | B | B | B | B | A | A |
| Comparative Example 3 | B | B | B | B | A | A |
| Comparative Example 4 | B | B | B | B | A | A |
| Comparative Example 5 | A | A | B | B | B | C |
| Comparative Example 6 | B | B | B | C | B | C |

As shown in Table 2, the inkjet recording inks of Examples prepared from the multiplayer microencapsulated pigments exhibited particularly excellent performances in scratch resistance, fixability, ejection stability and clogging reliability.

On the other hand, as for the inkjet recording inks of Reference Examples and Comparative Examples prepared from the monolayer microencapsulated pigments, the inks of Reference Examples 1 to 3 exhibited similar effects as those of Examples for ejection stability and clogging reliability, but did not exhibit effects as excellent as those of Examples for abrasion resistance, scratch resistance, fixability and glossiness. Further, as for the inkjet recording inks of Comparative Examples 1 and 2, effects as excellent as those of Examples were not found on the whole.

While the present invention has been described in detail and with reference to specific embodiments thereof, it will be apparent to one skilled in the art that various changes and modifications can be made therein without departing from the spirit and scope thereof.

The present application is based on Japanese Patent Application Nos. 2004-287728 and 2004-287788, each filed Sep. 30, 2004, the content thereof being herein incorporated by reference.

The invention claimed is:

1. Encapsulated matter comprising:
   a core material having a charge on a surface thereof; and
   a plurality of coating layers each mainly comprising a polymer, with which the core material is coated,
   the layers comprising at least a first coating layer and a second coating layer,
   wherein the polymer constituting the first coating layer which contacts the core material comprises at least:
   (1) a repeating structural unit derived from an ionic polymerizable surfactant A and/or an ionic monomer, each having a charge opposite to the surface charge of the core material; and
   (2) a repeating structural unit derived from an ionic polymerizable surfactant B having a charge of the same kind as or opposite to the surface charge of the core material, said repeating structural unit derived from the ionic polymerizable surfactant B imparting to the first coating layer a surface charge which is of the same kind as the charge of the repeating structural unit derived from the ionic polymerizable surfactant B; and wherein the polymer constituting the second coating layer which contacts the outside of the first coating layer comprises at least:
   (3) a repeating structural unit derived from an ionic polymerizable surfactant C and/or an ionic monomer, each having a charge opposite to the surface charge of the first coating layer; and
   (4) a repeating structural uinit derived from an ionic polymerizable surfactant D having a charge of the same kind as or opposite to the surface charge of the first coating layer.

2. The encapsulated matter according to claim 1, which has at least a third coating layer, wherein the polymer constituting the third coating layer comprises at least:
   (1) a repeating structural unit derived from an ionic polymerizable surfactant E and/or an ionic monomer, each having a charge opposite to the surface charge of a coating layer located immediately beneath; and
   (2) a repeating structural unit derived from an ionic polymerizable surfactant F having a charge of the same kind as or opposite to a surface charge imparted to the second coating layer by the repeating structural unit derived from the ionic polvmerizable surfactant D.

3. The encapsulated matter according to claim 1 which comprises, together with the repeating unit derived from the ionic polymerizable surfactant B or ionic polymerizable surfactant D, a repeating structural unit derived from an ionic monomer having a charge of the same kind as that of the respective ionic polymerizable surfactant.

4. The encapsulated matter according to claim 1, wherein at least any one polymer of the respective coating layers comprises a repeating structural unit derived from a hydrophobic monomer.

5. A process for producing the encapsulated matter according to claim 1, which process comprises:
   (1) adding the ionic polymerizable surfactant A and/or an ionic monomer, each having a charge opposite to the surface charge of the core material, to an aqueous dispersion of the core material having the charge on the surface thereof, followed by mixing; then,
   (2) adding the ionic polymerizable surfactant B having a charge of the same kind as or opposite to the surface charge of the core material, followed by mixing and emulsification, and adding a polymerization initiator thereto to conduct polymerization in water, thereby forming the first coating layer: subsequently, (3) adding the ionic polymerizable surfactant C and/or an ionic monomer, each having a charge opposite to the surface charge of the first coating layer to an aqueous dispersion of coated matter having the first coating layer, followed by mixing; and thereafter, (4) adding the ionic polymerizable surfactant D having a charge of the same kind as or opposite to the surface charge of the first coating layer, followed by mixing and emulsification, and adding a polymerization initiator thereto to conduct polymerization in water, thereby forming the second coating layer.

6. The process according to claim 5, which comprises:

(1) adding an ionic polymerizable surfactant E and/or an ionic monomer, each having a charge opposite to the surface charge of the encapsulated matter to an aqueous solution of the encapsulated matter with at least the first coating layer and the second coating layer formed, followed by mixing; and then, (2) adding an ionic polymerizable surfactant F having a charge of the same kind as or opposite to the surface charge of the encapsulated matter, followed by mixing and emulsification, and adding a polymerization initiator thereto to conduct polymerization in water, thereby forming a third coating layer.

7. The process according to claim 5, wherein a hydrophobic monomer is added together with each ionic polymerizable surfactant and/or ionic monomer at the time when at least any one of the respective coating layers is formed.

8. The process according to claim 7, wherein before the addition of the ionic polymerizable surfactant B or the ionic polymerizable surfactant D, the hydrophobic monomer is added, followed by mixing.

9. The process according to claim 7, wherein after the addition and mixing of the ionic polymerizable surfactant B or the ionic polymerizable surfactant D, the hydrophobic monomer is added, followed by mixing.

10. A process for producing the encapsulated matter according to claim 1, which process comprises:

(1) adding the ionic polymerizable surfactant A and/or an ionic monomer, each having a charge opposite to the surface charge of the core material to an aqueous dispersion of the core material having the charge on the surface thereof, followed by mixing; then, (2) adding the ionic polymerizable surfactant B having a charge of the same kind as or opposite to the surface charge of the core material and an ionic monomer having a charge of the same kind as that of the ionic polymerizable surfactant B, followed by mixing and emulsification, and adding a polymerization initiator thereto to conduct polymerization in water, thereby forming the first coating layer; subsequently, (3) adding the ionic polymerizable surfactant C and/or an ionic monomer, each having a charge opposite to the surface charge of the first coating layer to an aqueous dispersion of coated matter having the first coating layer, followed by mixing; and thereafter, (4) adding the ionic polymerizable surfactant D having a charge of the same kind as or opposite to the surface charge of the first coating layer and an ionic monomer having a charge of the same kind as that of the ionic polymerizable surfactant D, followed by mixing and emulsification, and adding a polymerization initiator thereto to conduct polymerization in water, thereby forming the second coating layer.

11. The process according to claim 10, which comprises:

(1) adding the ionic polymerizable surfactant E and/or an ionic monomer, each having a charge opposite to the surface charge of the encapsulated matter to an aqueous solution of the encapsulated matter with at least the first coating layer and the second coating layer formed, followed by mixing; and then, (2) adding the ionic polymerizable surfactant F having a charge of the same kind as or opposite to the surface charge of the encapsulated matter and an ionic monomer having a charge of the same kind as that of the ionic polymerizable surfactant D, followed by mixing and emulsification, and adding a polymerization initiator thereto to conduct polymerization in water, thereby forming a third or coating layer.

12. The process according to claim 10, wherein a hydrophobic monomer is added together with each ionic polymerizable surfactant and/or ionic monomer at the time when at least any one of the respective coating layers is formed.

13. The process according to claim 12, wherein before the addition of the ionic polymerizable surfactant B or the ionic polymerizable surfactant D, the hydrophobic monomer is added, followed by mixing.

14. The process according to claim 12, wherein after the addition and mixing of the ionic polymerizable surfactant B or the ionic polymerizable surfactant D, the hydrophobic monomer is added, followed by mixing.

15. The encapsulated matter according to claim 1, which is an encapsulated pigment, wherein the core material is a pigment particle.

16. A pigment dispersion comprising the encapsulated matter according to claim 15.

17. A pigment ink comprising the encapsulated matter according to claim 15.

* * * * *